United States Patent
Park

(10) Patent No.: US 10,481,365 B2
(45) Date of Patent: Nov. 19, 2019

(54) OPTICAL SYSTEM

(71) Applicant: Samsung Electro-Mechanics Co., Ltd., Suwon-si (KR)

(72) Inventor: Il Yong Park, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 0 days.

(21) Appl. No.: 15/069,520

(22) Filed: Mar. 14, 2016

(65) Prior Publication Data

US 2017/0045717 A1     Feb. 16, 2017

(30) Foreign Application Priority Data

Aug. 10, 2015 (KR) .................. 10-2015-0112493

(51) Int. Cl.
*G02B 13/00* (2006.01)
*G02B 9/62* (2006.01)

(52) U.S. Cl.
CPC .......... *G02B 13/0045* (2013.01); *G02B 9/62* (2013.01)

(58) Field of Classification Search
CPC ............... G02B 21/0068; G02B 21/33; G02B 13/0035; G02B 13/0045; G02B 9/62
USPC ....... 359/658, 716, 752, 756, 780, 757, 713, 359/759
See application file for complete search history.

(56) References Cited

U.S. PATENT DOCUMENTS

| | | | | |
|---|---|---|---|---|
| 9,036,272 B2 * | 5/2015 | Huang | ............. | G02B 3/04 359/713 |
| 9,817,214 B2 | 11/2017 | Kim et al. | | |
| 2013/0335833 A1 * | 12/2013 | Liao | ............. | G02B 13/0045 359/713 |
| 2014/0078603 A1 * | 3/2014 | You | ............. | G02B 13/0045 359/738 |
| 2015/0029599 A1 * | 1/2015 | Huang | ............. | G02B 3/04 359/713 |
| 2015/0062721 A1 * | 3/2015 | Kim | ............. | G02B 13/0045 359/713 |
| 2015/0131172 A1 | 5/2015 | Park et al. | | |
| 2016/0004044 A1 * | 1/2016 | Kubota | ............. | G02B 13/0045 359/713 |

(Continued)

FOREIGN PATENT DOCUMENTS

| CN | 104345431 A | 2/2015 |
|---|---|---|
| CN | 104635318 A | 5/2015 |

(Continued)

OTHER PUBLICATIONS

STIC search (Year: 2019).*

(Continued)

*Primary Examiner* — James R Greece
*Assistant Examiner* — Travis S Fissel
(74) *Attorney, Agent, or Firm* — NSIP Law

(57) ABSTRACT

An optical system includes a first lens including a positive refractive power, a second lens including a positive refractive power and a convex image-side surface, a third lens, and a fourth lens. The optical system includes a fifth lens including a concave object-side surface and a concave image-side surface, and a sixth lens including an inflection point formed on an image-side surface thereof. The first to sixth lenses are sequentially disposed from an object toward an imaging plane.

20 Claims, 24 Drawing Sheets

(56) References Cited

U.S. PATENT DOCUMENTS

2016/0054543 A1* 2/2016 Nabeta ............... G02B 13/0045
                                                        359/713
2016/0124193 A1  5/2016 Kim et al.
2016/0139368 A1  5/2016 You

FOREIGN PATENT DOCUMENTS

| CN | 105572852 A | 5/2016 |
|----|----|----|
| CN | 105607224 A | 5/2016 |
| JP | 2011-85733 A | 4/2011 |
| JP | 2013-195587 A | 9/2013 |
| KR | 20160051469 | * 11/2014 |
| KR | 10-2016-0051469 A | 5/2016 |

OTHER PUBLICATIONS

Korean office action dated Feb. 7, 2017 in corresponding Korean patent app. No. 10-2015-0112493 (10 pages in English, 6 pages in Korean).

Chinese Office Action dated May 28, 2018 in corresponding Chinese Patent Application No. 201610187342.8 (17 pages in English, 11 pages in Chinese).

* cited by examiner

| FIRST EMBODIMENT ||||||
|---|---|---|---|---|---|
| F number= 2.13 | | TTL = 4.632 | | f = 4.083 | |
| SURFACE NUMBER | | RADIUS OF CURVATURE | THICKNESS/ DISTANCE | REFRACTIVE INDEX | ABBE NUMBER | FOCAL LENGTH |
| 0 | STOP | | 0.0000 | | | |
| 1 | FIRST LENS | 1.5012 | 0.4343 | 1.547 | 56.1 | 6.430 |
| 2 | | 2.3530 | 0.1041 | | | |
| 3 | SECOND LENS | 2.5486 | 0.4321 | 1.547 | 56.1 | 4.024 |
| 4 | | -15.0835 | 0.0300 | | | |
| 5 | THIRD LENS | 26.1685 | 0.2200 | 1.657 | 21.5 | -6.017 |
| 6 | | 3.4248 | 0.3770 | | | |
| 7 | FOURTH LENS | -10.0835 | 0.3100 | 1.657 | 21.5 | 347.95 |
| 8 | | -9.7755 | 0.4374 | | | |
| 9 | FIFTH LENS | -86.0940 | 0.5630 | 1.657 | 21.5 | -120.655 |
| 10 | | 1000.0000 | 0.1369 | | | |
| 11 | SIXTH LENS | 1.8813 | 0.4716 | 1.537 | 55.7 | -9.940 |
| 12 | | 1.2690 | 0.2012 | | | |
| 13 | FILTER | Infinity | 0.2100 | 1.519 | 64.2 | |
| 14 | | Infinity | 0.7041 | | | |
| 15 | IMAGING PLANE | Infinity | 0.0000 | | | |

FIG. 3

| SURFACE NUMBER | 1 | 2 | 3 | 4 | 5 | 6 | 7 | 8 | 9 | 10 | 11 | 12 |
|---|---|---|---|---|---|---|---|---|---|---|---|---|
| RADIUS OF CURVATURE | 1.5012 | 2.3530 | 2.5486 | -15.0835 | 26.1685 | 3.4248 | -10.0835 | -2.7755 | -86.0940 | 1000.0000 | 1.8813 | 1.2690 |
| CONIC CONSTANT (K) | -0.453 | 0.000 | 0.000 | 0.000 | 0.000 | 10.759 | 0.000 | 0.000 | 0.000 | 0.000 | -0.564 | -4.685 |
| 4-TH ORDER COEFFICIENT (A) | -0.014 | -0.066 | -0.075 | -0.027 | 0.017 | 0.014 | -0.083 | -0.066 | 0.046 | -0.004 | -0.406 | -0.182 |
| 6-TH ORDER COEFFICIENT (B) | 0.061 | -0.075 | 0.056 | -0.052 | 0.054 | -0.023 | -0.040 | -0.109 | -0.228 | -0.074 | 0.193 | 0.009 |
| 8-TH ORDER COEFFICIENT (C) | -0.326 | 0.102 | -0.446 | 0.141 | -0.289 | 0.190 | 0.173 | 0.373 | 0.223 | 0.062 | -0.064 | -0.040 |
| 10-TH ORDER COEFFICIENT (D) | 0.754 | -0.077 | 1.453 | -0.211 | 0.816 | -0.875 | -0.129 | -0.537 | -0.144 | -0.032 | 0.015 | 0.011 |
| 12-TH ORDER COEFFICIENT (E) | -1.014 | 0.001 | -2.208 | 0.148 | -0.841 | 1.699 | -0.305 | 0.462 | 0.050 | 0.009 | -0.002 | -0.002 |
| 14-TH ORDER COEFFICIENT (F) | 0.708 | 0.227 | 1.974 | 0.168 | 0.794 | -1.594 | 0.579 | -0.213 | -0.009 | -0.001 | 0.000 | 0.000 |
| 16-TH ORDER COEFFICIENT (G) | -0.200 | -0.182 | -0.789 | -0.234 | -0.358 | 0.628 | -0.314 | 0.038 | 0.001 | 0.000 | 0.000 | 0.000 |
| 18-TH ORDER COEFFICIENT (H) | 0.000 | 0.000 | 0.000 | 0.000 | 0.000 | 0.000 | 0.000 | 0.000 | 0.000 | 0.000 | 0.000 | 0.000 |
| 20-TH ORDER COEFFICIENT (J) | 0.000 | 0.000 | 0.000 | 0.000 | 0.000 | 0.000 | 0.000 | 0.000 | 0.000 | 0.000 | 0.000 | 0.000 |

FIG. 4

| SECOND EMBODIMENT ||||||
|---|---|---|---|---|---|
| F number= 2.13 | TTL = 4.632 ||| f = 4.091 ||
| SURFACE NUMBER | | RADIUS OF CURVATURE | THICKNESS/ DISTANCE | REFRACTIVE INDEX | ABBE NUMBER | FOCAL LENGTH |
| 0 | STOP | Infinity | 0.0000 | | | |
| 1 | FIRST LENS | 1.4912 | 0.4317 | 1.547 | 56.1 | 6.479 |
| 2 | | 2.3126 | 0.1029 | | | |
| 3 | SECOND LENS | 2.5221 | 0.4331 | 1.547 | 56.1 | 4.032 |
| 4 | | -16.3887 | 0.0300 | | | |
| 5 | THIRD LENS | 24.0000 | 0.2200 | 1.657 | 21.5 | -6.104 |
| 6 | | 3.4255 | 0.3792 | | | |
| 7 | FOURTH LENS | -11.2660 | 0.3100 | 1.657 | 21.5 | -833.75 |
| 8 | | -11.6280 | 0.4403 | | | |
| 9 | FIFTH LENS | -1000.0000 | 0.5758 | 1.657 | 21.5 | -279.664 |
| 10 | | 225.3182 | 0.1279 | | | |
| 11 | SIXTH LENS | 1.8859 | 0.4600 | 1.537 | 55.7 | -9.708 |
| 12 | | 1.2667 | 0.2012 | | | |
| 13 | FILTER | Infinity | 0.2100 | 1.519 | 64.2 | |
| 14 | | Infinity | 0.7100 | | | |
| 15 | IMAGING PLANE | Infinity | 0.0000 | | | |

FIG. 7

| SURFACE NUMBER | 1 | 2 | 3 | 4 | 5 | 6 | 7 | 8 | 9 | 10 | 11 | 12 |
|---|---|---|---|---|---|---|---|---|---|---|---|---|
| RADIUS OF CURVATURE | 1.4912 | 2.3126 | 2.5221 | -16.3887 | 24.0000 | 3.4255 | -11.2660 | -11.6280 | -1000.0000 | 225.3182 | 1.8859 | 1.2667 |
| CONIC CONSTANT (K) | -0.455 | 0.000 | 0.000 | 0.000 | 0.000 | 10.850 | 0.000 | 0.000 | 0.000 | 0.000 | -0.558 | -4.789 |
| 4-TH ORDER COEFFICIENT (A) | -0.014 | -0.064 | -0.073 | -0.047 | -0.009 | 0.005 | -0.089 | -0.075 | 0.036 | -0.004 | -0.403 | -0.178 |
| 6-TH ORDER COEFFICIENT (B) | 0.066 | -0.071 | 0.070 | 0.049 | 0.167 | 0.006 | -0.034 | -0.082 | -0.215 | -0.080 | 0.192 | 0.095 |
| 8-TH ORDER COEFFICIENT (C) | -0.349 | 0.070 | -0.523 | -0.054 | -0.484 | 0.135 | 0.213 | 0.322 | 0.210 | 0.068 | -0.060 | -0.037 |
| 10-TH ORDER COEFFICIENT (D) | 0.800 | 0.031 | 1.714 | -0.103 | 0.668 | -0.818 | -0.311 | -0.458 | -0.134 | -0.034 | 0.013 | 0.009 |
| 12-TH ORDER COEFFICIENT (E) | -1.073 | -0.199 | -2.716 | 0.238 | -0.596 | 1.645 | 0.028 | 0.378 | 0.048 | 0.010 | -0.002 | -0.001 |
| 14-TH ORDER COEFFICIENT (F) | 0.745 | 0.404 | 2.459 | 0.054 | 0.532 | -1.521 | 0.266 | -0.167 | -0.010 | -0.002 | 0.000 | 0.000 |
| 16-TH ORDER COEFFICIENT (G) | -0.209 | -0.243 | -0.971 | -0.216 | -0.291 | 0.593 | -0.195 | 0.029 | 0.001 | 0.000 | 0.000 | 0.000 |
| 18-TH ORDER COEFFICIENT (H) | 0.000 | 0.000 | 0.000 | 0.000 | 0.000 | 0.000 | 0.000 | 0.000 | 0.000 | 0.000 | 0.000 | 0.000 |
| 20-TH ORDER COEFFICIENT (J) | 0.000 | 0.000 | 0.000 | 0.000 | 0.000 | 0.000 | 0.000 | 0.000 | 0.000 | 0.000 | 0.000 | 0.000 |

FIG. 8

| THIRD EMBODIMENT ||||||
| --- | --- | --- | --- | --- | --- |
| F number= 2.13 | | TTL = 4.632 | | f = 4.096 ||
| SURFACE NUMBER | | RADIUS OF CURVATURE | THICKNESS/ DISTANCE | REFRACTIVE INDEX | ABBE NUMBER | FOCAL LENGTH |
| 0 | STOP | Infinity | 0.0000 | | | |
| 1 | FIRST LENS | 1.4922 | 0.4352 | 1.547 | 56.1 | 6.362 |
| 2 | | 2.3447 | 0.1123 | | | |
| 3 | SECOND LENS | 2.5379 | 0.4338 | 1.547 | 56.1 | 4.008 |
| 4 | | −15.0204 | 0.0300 | | | |
| 5 | THIRD LENS | 28.9334 | 0.2200 | 1.657 | 21.5 | −6.002 |
| 6 | | 3.4617 | 0.3860 | | | |
| 7 | FOURTH LENS | −8.6033 | 0.3100 | 1.657 | 21.5 | 186.48 |
| 8 | | −8.1541 | 0.4539 | | | |
| 9 | FIFTH LENS | −44.1018 | 0.5820 | 1.657 | 21.5 | −63.924 |
| 10 | | 896.5926 | 0.1058 | | | |
| 11 | SIXTH LENS | 1.8514 | 0.4600 | 1.537 | 55.7 | −9.739 |
| 12 | | 1.2484 | 0.2012 | | | |
| 13 | FILTER | Infinity | 0.2100 | 1.519 | 64.2 | |
| 14 | | Infinity | 0.6916 | | | |
| 15 | IMAGING PLANE | Infinity | 0.0000 | | | |

FIG. 11

| SURFACE NUMBER | 1 | 2 | 3 | 4 | 5 | 6 | 7 | 8 | 9 | 10 | 11 | 12 |
|---|---|---|---|---|---|---|---|---|---|---|---|---|
| RADIUS OF CURVATURE | 1.4322 | 2.3447 | 2.5379 | -15.0204 | 28.9334 | 3.4617 | -8.6033 | -8.1541 | -44.1018 | 896.5926 | 1.8514 | 1.2484 |
| CONIC CONSTANT (K) | -0.442 | 0.000 | 0.000 | 0.000 | 0.000 | 10.800 | 0.000 | 0.000 | 0.000 | 0.000 | -0.579 | -4.931 |
| 4-TH ORDER COEFFICIENT (A) | -0.013 | -0.061 | -0.071 | -0.036 | 0.011 | 0.015 | -0.081 | -0.065 | 0.051 | 0.011 | -0.412 | -0.182 |
| 6-TH ORDER COEFFICIENT (B) | 0.059 | -0.066 | 0.058 | 0.005 | 0.090 | -0.008 | -0.076 | -0.121 | -0.248 | -0.110 | 0.202 | 0.099 |
| 8-TH ORDER COEFFICIENT (C) | -0.316 | 0.078 | -0.433 | -0.026 | -0.375 | 0.073 | 0.311 | 0.393 | 0.239 | 0.093 | -0.064 | -0.038 |
| 10-TH ORDER COEFFICIENT (D) | 0.722 | -0.021 | 1.434 | 0.129 | 0.747 | -0.496 | -0.450 | -0.535 | -0.145 | -0.045 | 0.014 | 0.009 |
| 12-TH ORDER COEFFICIENT (E) | -0.965 | -0.111 | -2.270 | -0.382 | -1.060 | 1.012 | 0.145 | 0.426 | 0.050 | 0.013 | -0.002 | -0.001 |
| 14-TH ORDER COEFFICIENT (F) | 0.667 | 0.310 | 2.077 | 0.686 | 1.076 | -0.942 | 0.212 | -0.182 | -0.011 | -0.002 | 0.000 | 0.000 |
| 16-TH ORDER COEFFICIENT (G) | -0.187 | -0.199 | -0.830 | -0.452 | -0.508 | 0.388 | -0.183 | 0.030 | 0.001 | 0.000 | 0.000 | 0.000 |
| 18-TH ORDER COEFFICIENT (H) | 0.000 | 0.000 | 0.000 | 0.000 | 0.000 | 0.000 | 0.000 | 0.000 | 0.000 | 0.000 | 0.000 | 0.000 |
| 20-TH ORDER COEFFICIENT (J) | 0.000 | 0.000 | 0.000 | 0.000 | 0.000 | 0.000 | 0.000 | 0.000 | 0.000 | 0.000 | 0.000 | 0.000 |

FIG. 12

| FOURTH EMBODIMENT ||||||
|---|---|---|---|---|---|
| F number= 2.31 | | TTL = 4.650 | | f = 4.150 | |
| SURFACE NUMBER | | RADIUS OF CURVATURE | THICKNESS/ DISTANCE | REFRACTIVE INDEX | ABBE NUMBER | FOCAL LENGTH |
| 0 | STOP | Infinity | 0.0000 | | | |
| 1 | FIRST LENS | 1.6456 | 0.4118 | 1.547 | 56.1 | 5.410 |
| 2 | | 3.3878 | 0.1598 | | | |
| 3 | SECOND LENS | 3.8660 | 0.4082 | 1.547 | 56.1 | 5.455 |
| 4 | | -12.4867 | 0.1000 | | | |
| 5 | THIRD LENS | 10.9800 | 0.2200 | 1.657 | 21.5 | -6.393 |
| 6 | | 3.0098 | 0.2752 | | | |
| 7 | FOURTH LENS | -1000.0000 | 0.3100 | 1.657 | 21.5 | 15.92 |
| 8 | | -10.3344 | 0.5219 | | | |
| 9 | FIFTH LENS | -1000.0000 | 0.7397 | 1.657 | 21.5 | -762.392 |
| 10 | | 1000.0000 | 0.1000 | | | |
| 11 | SIXTH LENS | 3.5396 | 0.4195 | 1.537 | 55.7 | -5.537 |
| 12 | | 1.5477 | 0.2295 | | | |
| 13 | FILTER | Infinity | 0.1100 | 1.516 | 55.1 | |
| 14 | | Infinity | 0.6443 | | | |
| 15 | IMAGING PLANE | Infinity | 0.0000 | | | |

FIG. 15

| SURFACE NUMBER | 1 | 2 | 3 | 4 | 5 | 6 | 7 | 8 | 9 | 10 | 11 | 12 |
|---|---|---|---|---|---|---|---|---|---|---|---|---|
| RADIUS OF CURVATURE | 1.6456 | 3.3878 | 3.8650 | -12.4867 | 10.9800 | 3.0098 | -1000.0000 | -10.3244 | -1000.0000 | 1000.0000 | 3.5396 | 1.5477 |
| CONIC CONSTANT (K) | -0.755 | 0.000 | 0.000 | 0.000 | 0.000 | 2.056 | 0.000 | 0.000 | 0.000 | 0.000 | 0.289 | -7.783 |
| 4-TH ORDER COEFFICIENT (A) | -0.010 | -0.069 | -0.065 | -0.162 | -0.198 | -0.108 | -0.092 | -0.087 | -0.045 | 0.013 | -0.310 | -0.146 |
| 6-TH ORDER COEFFICIENT (B) | -0.034 | 0.003 | 0.053 | 0.221 | 0.413 | 0.260 | 0.169 | 0.095 | -0.051 | -0.081 | 0.130 | 0.060 |
| 8-TH ORDER COEFFICIENT (C) | 0.065 | 0.021 | -0.094 | -0.184 | -0.604 | -0.312 | -0.547 | -0.166 | -0.043 | 0.049 | -0.029 | -0.015 |
| 10-TH ORDER COEFFICIENT (D) | -0.174 | -0.005 | 0.488 | -0.120 | 0.528 | 0.121 | 1.488 | 0.335 | 0.108 | -0.017 | 0.004 | 0.002 |
| 12-TH ORDER COEFFICIENT (E) | 0.199 | 0.127 | -0.666 | 0.660 | -0.252 | 0.175 | -2.255 | -0.297 | -0.094 | 0.004 | 0.000 | 0.000 |
| 14-TH ORDER COEFFICIENT (F) | -0.093 | -0.117 | 0.465 | -0.853 | 0.061 | -0.247 | 1.729 | 0.114 | 0.038 | 0.000 | 0.000 | 0.000 |
| 16-TH ORDER COEFFICIENT (G) | 0.012 | 0.025 | -0.151 | 0.389 | -0.006 | 0.127 | -0.555 | -0.016 | -0.006 | 0.000 | 0.000 | 0.000 |
| 18-TH ORDER COEFFICIENT (H) | 0.000 | 0.000 | 0.000 | 0.000 | 0.000 | 0.000 | 0.000 | 0.000 | 0.000 | 0.000 | 0.000 | 0.000 |
| 20-TH ORDER COEFFICIENT (J) | 0.000 | 0.000 | 0.000 | 0.000 | 0.000 | 0.000 | 0.000 | 0.000 | 0.000 | 0.000 | 0.000 | 0.000 |

FIG. 16

| FIFTH EMBODIMENT ||||||
|---|---|---|---|---|---|
| F number= 2.25 | | TTL = 4.500 | | f = 4.059 | |
| SURFACE NUMBER | | RADIUS OF CURVATURE | THICKNESS/ DISTANCE | REFRACTIVE INDEX | ABBE NUMBER | FOCAL LENGTH |
| 0 | STOP | Infinity | 0.0000 | | | |
| 1 | FIRST LENS | 1.5269 | 0.4210 | 1.547 | 56.1 | 5.249 |
| 2 | | 2.9502 | 0.1116 | | | |
| 3 | SECOND LENS | 3.0160 | 0.3964 | 1.547 | 56.1 | 6.964 |
| 4 | | 13.9097 | 0.1000 | | | |
| 5 | THIRD LENS | 11.0146 | 0.2260 | 1.657 | 21.5 | -8.818 |
| 6 | | 3.7608 | 0.2662 | | | |
| 7 | FOURTH LENS | -1000.0000 | 0.3100 | 1.657 | 21.5 | 17.91 |
| 8 | | -11.6079 | 0.4817 | | | |
| 9 | FIFTH LENS | -1000.0000 | 0.5792 | 1.657 | 21.5 | -686.904 |
| 10 | | 819.7810 | 0.1000 | | | |
| 11 | SIXTH LENS | 3.3850 | 0.4722 | 1.537 | 55.7 | -6.296 |
| 12 | | 1.6077 | 0.2295 | | | |
| 13 | FILTER | Infinity | 0.1100 | 1.516 | 55.1 | |
| 14 | | Infinity | 0.6963 | | | |
| 15 | IMAGING PLANE | Infinity | 0.0000 | | | |

FIG. 19

| SURFACE NUMBER | 1 | 2 | 3 | 4 | 5 | 6 | 7 | 8 | 9 | 10 | 11 | 12 |
|---|---|---|---|---|---|---|---|---|---|---|---|---|
| RADIUS OF CURVATURE | 1.5269 | 2.9502 | 3.0160 | 13.9397 | 11.0146 | 3.7608 | -1000.0000 | -11.6079 | -1000.0000 | 819.7810 | 3.3850 | 1.6077 |
| CONIC CONSTANT (K) | -0.690 | 0.000 | 0.000 | 0.000 | 0.000 | 4.678 | 0.000 | 0.000 | 0.000 | 0.000 | 0.308 | -7.783 |
| 4-TH ORDER COEFFICIENT (A) | -0.006 | -0.078 | -0.057 | -0.132 | -0.211 | -0.110 | -0.103 | -0.091 | -0.015 | 0.029 | -0.313 | -0.149 |
| 6-TH ORDER COEFFICIENT (B) | -0.027 | 0.020 | 0.086 | 0.129 | 0.298 | 0.218 | 0.213 | 0.120 | -0.191 | -0.124 | 0.129 | 0.063 |
| 8-TH ORDER COEFFICIENT (C) | 0.051 | -0.045 | -0.225 | -0.020 | -0.330 | -0.107 | -0.885 | -0.290 | 0.052 | 0.082 | -0.027 | -0.016 |
| 10-TH ORDER COEFFICIENT (D) | -0.158 | 0.156 | 0.932 | -0.363 | 0.250 | -0.138 | 2.673 | 0.642 | 0.022 | -0.032 | 0.003 | 0.002 |
| 12-TH ORDER COEFFICIENT (E) | 0.181 | -0.002 | -1.387 | 1.122 | -0.105 | 0.325 | -4.407 | -0.651 | -0.038 | 0.008 | 0.000 | 0.000 |
| 14-TH ORDER COEFFICIENT (F) | -0.081 | -0.106 | 1.101 | -1.466 | 0.021 | -0.304 | 3.663 | 0.269 | 0.018 | -0.001 | 0.000 | 0.000 |
| 16-TH ORDER COEFFICIENT (G) | 0.009 | 0.040 | -0.395 | 0.706 | -0.002 | 0.203 | -1.275 | -0.052 | -0.003 | 0.000 | 0.000 | 0.000 |
| 18-TH ORDER COEFFICIENT (H) | 0.000 | 0.000 | 0.000 | 0.000 | 0.000 | 0.000 | 0.000 | 0.000 | 0.000 | 0.000 | 0.000 | 0.000 |
| 20-TH ORDER COEFFICIENT (J) | 0.000 | 0.000 | 0.000 | 0.000 | 0.000 | 0.000 | 0.000 | 0.000 | 0.000 | 0.000 | 0.000 | 0.000 |

FIG. 20

| SIXTH EMBODIMENT | | | | | | |
|---|---|---|---|---|---|---|
| F number = | 2.29 | TTL = | 4.600 | f = | 4.129 | |
| SURFACE NUMBER | | RADIUS OF CURVATURE | THICKNESS/ DISTANCE | REFRACTIVE INDEX | ABBE NUMBER | FOCAL LENGTH |
| 0 | STOP | Infinity | 0.0000 | | | |
| 1 | FIRST LENS | 1.5799 | 0.4185 | 1.547 | 56.1 | 5.236 |
| 2 | | 3.2015 | 0.1402 | | | |
| 3 | SECOND LENS | 3.4645 | 0.4032 | 1.547 | 56.1 | 6.072 |
| 4 | | -73.5700 | 0.1000 | | | |
| 5 | THIRD LENS | 10.7493 | 0.2200 | 1.657 | 21.5 | -7.313 |
| 6 | | 3.2891 | 0.2762 | | | |
| 7 | FOURTH LENS | -1000.0000 | 0.3100 | 1.657 | 21.5 | 20.74 |
| 8 | | -13.4188 | 0.4784 | | | |
| 9 | FIFTH LENS | -1000.0000 | 0.6645 | 1.657 | 21.5 | -762.404 |
| 10 | | 1000.0000 | 0.1000 | | | |
| 11 | SIXTH LENS | 3.4707 | 0.4848 | 1.537 | 55.7 | -6.090 |
| 12 | | 1.6002 | 0.2295 | | | |
| 13 | FILTER | Infinity | 0.1100 | 1.519 | 64.2 | |
| 14 | | Infinity | 0.6647 | | | |
| 15 | IMAGING PLANE | Infinity | 0.0000 | | | |

FIG. 23

| SURFACE NUMBER | 1 | 2 | 3 | 4 | 5 | 6 | 7 | 8 | 9 | 10 | 11 | 12 |
|---|---|---|---|---|---|---|---|---|---|---|---|---|
| RADIUS OF CURVATURE | 1.5799 | 3.2015 | 3.4645 | -73.5700 | 10.7493 | 3.2891 | -1000.0000 | -13.4188 | -1000.0000 | 1000.0000 | 3.4707 | 1.6002 |
| CONIC CONSTANT (K) | -0.704 | 0.000 | 0.000 | 0.000 | 0.000 | 2.853 | 0.000 | 0.000 | 0.000 | 0.000 | 0.275 | -7.783 |
| 4-TH ORDER COEFFICIENT (A) | -0.008 | -0.060 | -0.050 | -0.161 | -0.208 | -0.108 | -0.095 | -0.088 | -0.028 | 0.024 | -0.286 | -0.133 |
| 6-TH ORDER COEFFICIENT (B) | -0.008 | -0.001 | 0.056 | 0.193 | 0.324 | 0.221 | 0.207 | 0.111 | -0.102 | -0.107 | 0.115 | 0.053 |
| 8-TH ORDER COEFFICIENT (C) | -0.047 | 0.000 | -0.152 | -0.256 | -0.380 | -0.179 | -0.776 | -0.241 | 0.000 | 0.070 | -0.024 | -0.013 |
| 10-TH ORDER COEFFICIENT (D) | 0.096 | 0.076 | 0.669 | 0.287 | 0.303 | -0.016 | 2.174 | 0.517 | 0.050 | -0.027 | 0.003 | 0.002 |
| 12-TH ORDER COEFFICIENT (E) | -0.149 | -0.002 | -0.951 | 0.026 | -0.138 | 0.208 | -3.369 | -0.506 | -0.057 | 0.037 | 0.000 | 0.000 |
| 14-TH ORDER COEFFICIENT (F) | 0.123 | -0.041 | 0.702 | -0.457 | 0.032 | -0.216 | 2.641 | 0.222 | 0.026 | -0.001 | 0.000 | 0.000 |
| 16-TH ORDER COEFFICIENT (G) | -0.039 | 0.012 | -0.233 | 0.320 | -0.003 | 0.130 | -0.868 | -0.037 | -0.004 | 0.000 | 0.000 | 0.000 |
| 18-TH ORDER COEFFICIENT (H) | 0.000 | 0.000 | 0.000 | 0.000 | 0.000 | 0.000 | 0.000 | 0.000 | 0.000 | 0.000 | 0.000 | 0.000 |
| 20-TH ORDER COEFFICIENT (J) | 0.000 | 0.000 | 0.000 | 0.000 | 0.000 | 0.000 | 0.000 | 0.000 | 0.000 | 0.000 | 0.000 | 0.000 |

FIG. 24

OPTICAL SYSTEM

CROSS-REFERENCE TO RELATED APPLICATION

This application claims the priority and benefit under 35 USC 119(a) of Korean Patent Application No. 10-2015-0112493, filed on Aug. 10, 2015 with the Korean Intellectual Property Office, the disclosure of which is incorporated herein by reference.

BACKGROUND

1. Field

The following description relates to an optical system including lenses having refractive power.

2. Description of Related Art

Over the years, camera modules have gradually been miniaturized. In addition, camera module performance has gradually improved. As an example, pixels of an image sensor have become small enough to enable realization of high resolution.

Typically, an optical system of a small camera module includes four lenses. However, it is difficult for the optical system including the four lenses to implement a clear image. Therefore, development of an optical system including five or more lenses is needed in order to enable realization of a clear image.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In accordance with an embodiment, there is provided an optical system, including: a first lens including a positive refractive power; a second lens including a positive refractive power and a convex image-side surface; a third lens; a fourth lens; a fifth lens including a concave object-side surface and a concave image-side surface; and a sixth lens including an inflection point formed on an image-side surface thereof, wherein the first to sixth lenses are sequentially disposed from an object toward an imaging plane.

f, an overall focal length of the optical system and, f1, a focal length of the first lens may satisfy 1.0<f1/f<1.8.

V1, an Abbe number of the first lens and, V2, an Abbe number of the second lens may satisfy V1−V2<25.

f, an overall focal length of the optical system and, f2, a focal length of the second lens may satisfy 0.5<f2/f<2.0.

f, an overall focal length of the optical system and, f3, a focal length of the third lens may satisfy −3<f3/f<−1.

f, an overall focal length of the optical system and, f4, a focal length of the fourth lens may satisfy 3<|f4/f|.

f1, a focal length of the first lens and, f2, a focal length of the second lens may satisfy 0.5<f1/f2<2.0.

f, an overall focal length of the optical system and, r6, a radius of curvature of an image-side surface of the third lens may satisfy 0.3<r6/f<1.4.

f, an overall focal length of the optical system and r10 a radius of curvature of an image-side surface of the fifth lens may satisfy 30<r10/f.

EPD, a diameter of an entrance pupil of the optical system and, f12, a synthetic focal length of the first lens and the second lens may satisfy 0.18<(EPD/2)/f12.

In accordance with another embodiment, there is provided an optical system, including: a first lens including a positive refractive power; a second lens including a convex image-side surface; a third lens including a convex object-side surface; a fourth lens including a convex image-side surface; a fifth lens including a concave object-side surface and a concave image-side surface; and a sixth lens including an inflection point formed on an image-side surface thereof, wherein the first to sixth lenses are sequentially disposed from an object toward an imaging plane.

The first lens may include a convex object-side surface and a concave image-side surface.

The second lens may include a convex object-side surface.

The third lens may include a concave image-side surface.

The fourth lens may include a concave object-side surface.

The sixth lens may include a convex object-side surface and a concave image-side surface.

In accordance with another embodiment, there is provided an optical system, including: a first lens; a second lens including a convex image-side surface; a third lens including a convex object-side surface; a fourth lens including a convex image-side surface; a fifth lens including a concave object-side surface and a concave image-side surface; and a sixth lens including an inflection point formed on an image-side surface thereof, wherein the second lens has a same refractive power as a refractive power of the first lens, the third lens, the fourth lens, and the fifth lens have a refractive power higher than the refractive powers of the first and second lenses, and the sixth lens has a refractive power lower than the refractive powers of the first and second lenses.

V1, an Abbe number of the first lens, V2, an Abbe number of the second lens, V3, an Abbe number of the third lens, and, V5, an Abbe number of the fifth lens may satisfy V1−V2<25, 15<|V1−V3|, and 25<V1−V5<45.

f, an overall focal length of the optical system, and f5 a focal length of the fifth lens may satisfy f5/f<−10.

f, an overall focal length of the optical system, and TTL a distance from the object-side surface of the first lens to an imaging plane may satisfy TTL/f<1.5.

f2, a focal length of the second lens, and, f3, a focal length of the third lens may satisfy −1.2<f2/f3<0.

f, an overall focal length of the optical system, and, BFL, a distance from an object-side surface of the sixth lens to an imaging plane may satisfy BFL/f<0.5.

f, an overall focal length of the optical system, and, D2, a distance from the image-side surface of the first lens to an object-side surface of the second lens may satisfy D2/f<0.1.

FOV, a field of view of the optical system may satisfy 75<FOV.

Other features and aspects will be apparent from the following detailed description, the drawings, and the claims.

BRIEF DESCRIPTION OF DRAWINGS

These and/or other aspects will become apparent and more readily appreciated from the following description of the embodiments, taken in conjunction with the accompanying drawings in which:

FIG. 3 is a table representing characteristics of the optical system, according to the first embodiment;

FIG. 4 is a table representing aspherical characteristics of the optical system according to the first embodiment;

FIG. 7 is a table representing characteristics of the optical system, according to the second embodiment;

FIG. 8 is a table representing aspherical characteristics of the optical system according to the second embodiment;

FIG. 11 is a table representing characteristics of the optical system, according to the third embodiment;

FIG. 12 is a table representing aspherical characteristics of the optical system, according to the third embodiment;

FIG. 15 is a table representing characteristics of the optical system, according to the fourth embodiment;

FIG. 16 is a table representing aspherical characteristics of the optical system, according to the fourth embodiment;

FIG. 19 is a table representing characteristics of the optical system, according to the fifth embodiment;

FIG. 20 is a table representing aspherical characteristics of the optical system, according to the fifth embodiment;

FIG. 23 is a table representing characteristics of the optical system, according to the sixth embodiment; and FIG. 24 is a table representing aspherical characteristics of the optical system, according to the sixth embodiment.

Figure 1:
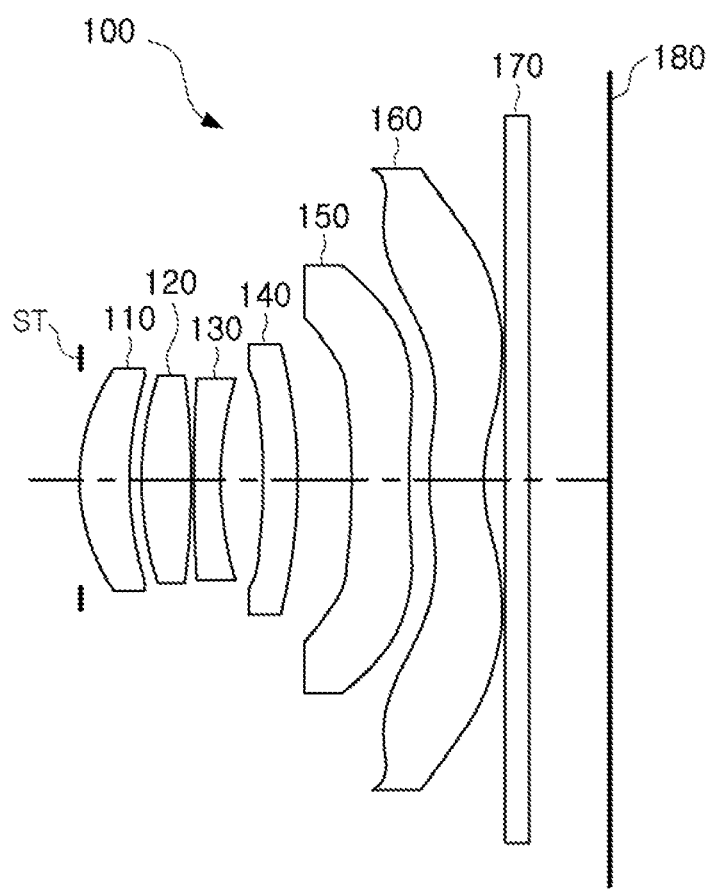
FIG. 1 is a view of an optical system, according to a first embodiment.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent to one of ordinary skill in the art. The sequences of operations described herein are merely examples, and are not limited to those set forth herein, but may be changed as will be apparent to one of ordinary skill in the art, with the exception of operations necessarily occurring in a certain order. Also, descriptions of functions and constructions that are well known to one of ordinary skill in the art may be omitted for increased clarity and conciseness.

The features described herein may be embodied in different forms, and are not to be construed as being limited to the examples described herein. Rather, the examples described herein have been provided so that this disclosure will be thorough and complete, and will convey the full scope of the disclosure to one of ordinary skill in the art.

The features described herein may be embodied in different forms, and are not to be construed as being limited to the examples described herein. Rather, the examples described herein have been provided so that this disclosure will be thorough and complete, and will convey the full scope of the disclosure to one of ordinary skill in the art.

It will be understood that, although the terms first, second, third, etc. may be used herein to describe various lenses, these lenses should not be limited by these terms. These terms are only used to distinguish one lens from another lens. These terms do not necessarily imply a specific order or arrangement of the lenses. Thus, a first lens discussed below could be termed a second lens without departing from the teachings description of the various embodiments.

In addition, a surface of each lens closest to an object is referred to as a first surface or an object-side surface, and a surface of each lens closest to an imaging surface is referred to as a second surface or an image-side surface. Further, all numerical values of radii of curvature, thicknesses/distances, TTLs, and other parameters of the lenses are represented in millimeters (mm). A person skilled in the relevant art will appreciate that other units of measurement may be used. Further, in the present specification, all radii of curvature, thicknesses, OALs (optical axis distances from the first surface of the first lens to the image sensor (OALs), a distance on the optical axis between the stop and the image sensor (SLs), image heights (IMGHs) (image heights), and black focus lengths (BFLs) (back focus lengths) of the lenses, an overall focal length of an optical system, and a focal length of each lens are indicated in millimeters (mm). Further, thicknesses of lenses, gaps between the lenses, OALs, and SLs are distances measured based on an optical axis of the lenses.

In addition, in an embodiment, shapes of lenses are described and illustrated in relation to optical axis portions of the lenses.

A surface of a lens being convex means that an optical axis portion of a corresponding surface is convex, and a surface of a lens being concave means that an optical axis portion of a corresponding surface is concave. Therefore, in a configuration in which one surface of a lens is described as being convex, an edge portion of the lens may be concave. Likewise, in a configuration in which one surface of a lens is described as being concave, an edge portion of the lens may be convex. In other words, a paraxial region of a lens may be convex, while the remaining portion of the lens outside the paraxial region is either convex, concave, or flat. Further, a paraxial region of a lens may be concave, while the remaining portion of the lens outside the paraxial region is either convex, concave, or flat.

In addition, in an embodiment, thicknesses and radii of curvatures of lenses are measured in relation to optical axes of the corresponding lenses.

An optical system, according to an embodiment, includes six lenses. As an example, the optical system may include a first lens, a second lens, a third lens, a fourth lens, a fifth lens, and a sixth lens. The lens module may include from four lenses up to six lenses without departing from the scope of the embodiments herein described. In accordance with an illustrative example, the embodiments described of the optical system include six lenses with a refractive power. However, a person of ordinary skill in the relevant art will appreciate that the number of lenses in the optical system may vary, for example, between two to six lenses, while achieving the various results and benefits described hereinbelow. Also, although each lens is described with a particular refractive power, a different refractive power for at least one of the lenses may be used to achieve the intended result. In the optical system, according to embodiments, the first to sixth lenses are formed of materials including glass, plastic or other similar types of polycarbonate materials. In another embodiment, at least one of the first through sixth lenses is formed of a material different from the materials forming the other first through sixth lenses.

The first lens has a refractive power. As an example, the first lens has a positive refractive power. An image-side surface of the first lens is concave. The first lens may have an aspherical surface. As an example, both of the object-side surface and an image-side surface of the first lens are aspherical. The first lens is formed of plastic. However, a material of the first lens is not limited to plastic.

The second lens has a refractive power. As an example, the second lens has a positive refractive power. An object-side surface or an image-side surface of the second lens is convex. The second lens may have an aspherical surface. As an example, both of the object-side surface and the image-side surface of the second lens are aspherical. The second lens may be formed of plastic. However, a material of the second lens is not limited to plastic.

The third lens has a refractive power, such as a positive refractive power or a negative refractive power. An object-side surface of the third lens is convex. The third lens may have an aspherical surface. As an example, both of the object-side surface and an image-side surface of the third lens are aspherical. The third lens may be formed of plastic. However, a material of the third lens is not limited to plastic.

The fourth lens has a refractive power. As an example, the fourth lens may have a positive refractive power. As another example, the fourth lens may also have a negative refractive power. An image-side surface of the fourth lens is convex. The fourth lens may have an aspherical surface. As an example, both of an object-side surface and the image-side surface of the fourth lens are aspherical. The fourth lens may be formed of plastic. However, a material of the fourth lens is not limited to plastic. In one example, the object-side surface of the fourth lens is concave in a paraxial region and gradually flattens at edge portions thereof.

The fifth lens has a refractive power. As an example, the fifth lens has a negative refractive power. Both surfaces of the fifth lens are concave. The fifth lens may have an aspherical surface. As an example, both of an object-side surface and an image-side surface of the fifth lens are aspherical. The fifth lens has an inflection point. As an example, one or more inflection points are formed on the image-side surface of the fifth lens. The fifth lens may be formed of plastic. However, a material of the fifth lens is not limited to plastic. In one example, the object-side surface of the fourth lens is concave in a paraxial region and gradually flattens at edge portions thereof.

The sixth lens has a refractive power. An image-side surface of the sixth lens is concave. The sixth lens may have an aspherical surface. As an example, both of an object-side surface and the image-side surface of the sixth lens are aspherical. The sixth lens has an inflection point. As an example, one or more inflection points are formed on the image-side surface of the sixth lens. The sixth lens may be formed of plastic. However, a material of the sixth lens is not limited to plastic.

A person of ordinary skill in the relevant art will appreciate that each of the first through fifth lenses may be configured in an opposite refractive power from the configuration described above. For example, in an alternative configuration, the first lens has a negative refractive power, the second lens has a negative refractive power, the third lens has a negative refractive power, the fourth lens has a positive refractive power, the fifth lens has a positive refractive power, and the sixth lens has a negative refractive power.

The optical system includes a filter and an image sensor. The filter is disposed between the sixth lens and the image sensor. The filter may filter an infrared component from incident light refracted through the first to sixth lenses. The image sensor is disposed behind the filter, and converts the incident light refracted through the first to sixth lenses into electrical signals.

The optical system includes a stop. The stop may adjust an amount of light incident to the first to sixth lenses. As an example, the stop is disposed adjacently to the object-side surface of the first lens to adjust an amount of light incident to the first lens.

The optical system satisfies the following Conditional Expression 1:

$$1.0 < f1/f < 1.8. \qquad \text{[Conditional Expression 1]}$$

In one example, f is an overall focal length of the optical system, and f1 is a focal length of the first lens. The above Conditional Expression 1 indicates a condition that limits a magnitude of refractive power of the first lens to overall refractive power of the optical system. As an example, in a case in which f1/f is outside of a lower limit value of the above Conditional Expression 1, the first lens has a significantly great refractive power, in such a manner that it is difficult to correct spherical aberration. As another example, in a case in which f1/f is outside of an upper limit value of the above Conditional Expression 1, the first lens has significantly low refractive power, which is advantageous in correcting spherical aberration, but makes miniaturization of the optical system difficult.

The optical system satisfies one or more of the following Conditional Expressions 2 through 4:

$$V1-V2<25 \qquad \text{[Conditional Expression 2]}$$

$$15<|V1-V3| \qquad \text{[Conditional Expression 3]}$$

$$25<V1-V5<45. \qquad \text{[Conditional Expression 4]}$$

In an example, V1 is an Abbe number of the first lens, V2 is an Abbe number of the second lens, V3 is an Abbe number of the third lens, and V5 is an Abbe number of the fifth lens. The Conditional Expressions 2 through 4 represent or define limit conditions to correct chromatic aberration of the optical system. As an example, in a case in which V1–V2, |V1–V3|, and V1–V5 are out of numerical ranges of the Conditional Expressions 2 through 4, respectively, the optical system has significantly high chromatic aberration, in such a manner that it is difficult to use the optical system in a camera module that needs to provide a high resolution.

The optical system satisfies the following Conditional Expression 5:

$$0.5 < f2/f < 2.0. \qquad \text{[Conditional Expression 5]}$$

In an example, f is the overall focal length of the optical system, and f2 is a focal length of the second lens. The Conditional Expression 5 represents or defines a condition to limit a magnitude of refractive power of the second lens to the overall refractive power of the optical system. As an example, in a case in which f2/f is outside of a lower limit value of the Conditional Expression 5, the second lens has significantly great refractive power, in such a manner that it is difficult to correct spherical aberration. As another example, in a case in which f2/f is outside of an upper limit value of the Conditional Expression 5, the second lens has significantly low refractive power, which is advantageous to correct spherical aberration, but makes miniaturization of the optical system difficult.

The optical system satisfies the following Conditional Expression 6:

$$-3.0 < f3/f < -1.0.$$ [Conditional Expression 6]

In an example, f is the overall focal length of the optical system, and f3 is a focal length of the third lens. The Conditional Expression 6 represents or defines a condition for limiting a magnitude of refractive power of the third lens to the overall refractive power of the optical system. As an example, in a case in which f3/f is outside of a lower limit value of the Conditional Expression 6, the third lens has significantly great refractive power making it difficult to correct spherical aberration. As another example, in a case in which f3/f is outside of an upper limit value of the Conditional Expression 6, the third lens has significantly low refractive power, which is advantageous in correcting spherical aberration, but makes miniaturization of the optical system difficult.

The optical system satisfies the following Conditional Expression 7:

$$3 < |f4/f|.$$ [Conditional Expression 7]

In an example, f is the overall focal length of the optical system, and f4 is a focal length of the fourth lens. The Conditional Expression 7 represents or defines a condition for limiting a magnitude of refractive power of the fourth lens to the overall refractive power of the optical system. As an example, in a case in which f4/f is outside of a lower limit value of the Conditional Expression 7, the fourth lens has significantly great refractive power, in such a manner that it is difficult to correct spherical aberration.

The optical system satisfies the following Conditional Expression 8:

$$f5/f < -10.$$ [Conditional Expression 8]

In an embodiment, f is the overall focal length of the optical system, and f5 is a focal length of the fifth lens. The Conditional Expression 8 represents or defines a condition to limit a magnitude of refractive power of the fifth lens to the overall refractive power of the optical system. As an example, in a case in which f5/f is outside of an upper limit value of the Conditional Expression 8, the fifth lens has significantly great refractive power making it difficult to correct spherical aberration.

The optical system satisfies the following Conditional Expression 9:

$$TTL/f < 1.5.$$ [Conditional Expression 9]

In an example, f is the overall focal length of the optical system, and TTL is a distance from the object-side surface of the first lens to an imaging plane. The Conditional Expression 9 represents or defines a condition for miniaturizing the optical system. As an example, in a case in which TTL/f is outside of an upper limit value of the Conditional Expression 9, it is difficult to mount the optical system in a small portable terminal.

The optical system satisfies the following Conditional Expression 10:

$$0.5 < f1/f2 < 2.0.$$ [Conditional Expression 10]

In one example, f1 is the focal length of the first lens, and f2 is the focal length of the second lens. The Conditional Expression 10 represents or defines a condition for limiting a ratio of refractive power between the first lens and the second lens. As an example, in a case in which f1/f2 is outside of a numerical range of the Conditional Expression 10, refractive power of the first lens or the second lens is significantly great making it difficult to correct aberration.

The optical system satisfies the following Conditional Expression 11:

$$-1.2 < f2/f3 < 0.$$ [Conditional Expression 11]

In an embodiment, f2 is the focal length of the second lens, and f3 is the focal length of the third lens. The Conditional Expression 11 represents or defines a condition to limit a ratio of refractive power between the second lens and the third lens. As an example, in a case in which f2/f3 is outside of a numerical range of the Conditional Expression 11, refractive power of the second lens or the third lens is significantly great, in such a manner that it is difficult to correct aberration.

The optical system satisfies the following Conditional Expression 12:

$$BFL/f < 0.5.$$ [Conditional Expression 12]

In one example, f is the overall focal length of the optical system, and BFL is a distance from the object-side surface of the sixth lens to the imaging plane. The Conditional Expression 12 represents or defines a condition for miniaturizing the optical system. As an example, in a case in which BFL/f is outside of an upper limit value of the Conditional Expression 12, it is difficult to miniaturize the optical system.

The optical system satisfies the following Conditional Expression 13:

$$D2/f < 0.1.$$ [Conditional Expression 13]

In an example, f is the overall focal length of the optical system, and D2 is a distance from the image-side surface of the first lens to the object-side surface of the second lens. The Conditional Expression 13 represents or defines a condition for improving longitudinal chromatic aberration characteristics. As an example, in a case in which D2/f is outside of an upper limit value of the Conditional Expression 13, longitudinal chromatic aberration characteristics of the first lens and the second lens deteriorate.

The optical system satisfies the following Conditional Expression 14:

$$0.3 < r6/f < 1.4.$$ [Conditional Expression 14]

In an embodiment, f is the overall focal length of the optical system, and r6 is a radius of curvature of the image-side surface of the third lens. The above Conditional Expression 14 represents or defines a condition to limit refractive power of the third lens. As an example, in a case in which r6/f is outside of a numerical range of the Conditional Expression 14, it is not easy to manufacture the third lens, and it is difficult to secure the required refractive power.

The optical system satisfies the following Conditional Expression 15:

$$30 < r10/f.$$ [Conditional Expression 15]

In an example, f is the overall focal length of the optical system, and r10 is a radius of curvature of the image-side surface of the fifth lens. The above Conditional Expression represents or defines a condition for limiting refractive power of the fifth lens. As an example, in a case in which r10/f is outside of a numerical range of the Conditional Expression 15, it is not easy to manufacture the fifth lens, and it is difficult to secure the required refractive power.

The optical system satisfies the following Conditional Expression 16:

$$0.18 < (EPD/2)/f12.\quad\text{[Conditional Expression 16]}$$

In one embodiment, EPD is a diameter of an entrance pupil of the optical system, and f12 is a synthetic focal length of the first lens and the second lens. The above Conditional Expression represents or defines a condition for realizing an optical system capable of realizing bright images. As an example, in a case in which EPD/2 is outside of a lower limit value of the Conditional Expression 16, it is difficult to secure an amount of light incident to the image sensor, in such a manner that the optical system may not be adequately used in a camera module and produce high resolution.

The optical system satisfies one or more of the following Conditional Expressions 17 and 18:

$$75 < FOV \quad\text{[Conditional Expression 17]}$$

$$F\text{ number} < 2.3. \quad\text{[Conditional Expression 18]}$$

In an example, FOV is a field of view of the optical system.

In the optical system configured as described above, strong positive refractive power is dispersed to the first lens and the second lens. In addition, in the optical system according to an embodiment, tolerance sensitivity of the first lens is reduced, and a phenomenon that a radius of curvature of the object-side surface of the first lens becomes excessively low is alleviated.

Also, in one embodiment, each of the first to sixth lenses may be separate lenses configured as described above. A distance between lenses may vary. In another embodiment, at least one of the first to sixth lenses may be operatively connected or in contact with another one of the first to sixth lenses.

In a further alternative embodiment, two or more of the lenses of the first to sixth lenses may be configured as a group and in operative connection or contact with another lens. For instance, the first, second, and third lenses may be in contact with each other as a first group lens, while the fourth, fifth, and sixth lenses are configured separate from each other and from the first group lens. In the alternative, the first, second, and third lenses may be in contact with each other as a first group lens, the fourth and the fifth lenses may be in contact with each other as a second group lens, and the sixth lens is configured separate from the first and second group lenses.

Next, several embodiments will be described.

An optical system, according to a first embodiment will be described with reference to FIG. 1.

The optical system 100, according to an embodiment, includes first to sixth lenses 110 to 160. The first to sixth lenses 110 to 160 are sequentially disposed from an object toward an imaging plane.

The first lens 110 has a positive refractive power. An object-side surface of the first lens 110 is convex, and an image-side surface thereof is concave. For example, a first surface of the first lens 110 is convex in a paraxial region, and a second surface of the first lens 110 is concave in the paraxial region. The first lens 110 has an aspherical shape. As an example, both of the object-side surface and the image-side surface of the first lens 110 are aspherical. In one example, the first lens 110 is formed of a material having a refractive index of 1.547. A focal length of the first lens 110 may be 6.430 mm.

The second lens 120 has a positive refractive power. An object-side surface of the second lens 120 is convex, and an image-side surface thereof is convex. In one example, the first and second surfaces of the second lens are convex in the paraxial region. The second lens 120 has an aspherical shape. As an example, both of the object-side surface and the image-side surface of the second lens 120 are aspherical. The second lens 120 is formed of a material that is substantially the same as or similar to that of the first lens. As an example, the second lens 120 has a refractive power of 1.547, which is the same as that of the first lens. A focal length of the second lens 120 may be 4.024 mm.

The third lens 130 has a negative refractive power. An object-side surface of the third lens 130 is convex, and an image-side surface thereof is concave. For example, a first surface of the third lens 130 is convex in the paraxial region, and a second surface of the third lens 130 is concave in the paraxial region. The third lens 130 has an aspherical shape. As an example, both of the object-side surface and the image-side surface of the third lens 130 are aspherical. The third lens 130 has a refractive power higher than those of the first and second lenses. As an example, the refractive power of the third lens 130 is 1.657, which is higher than those of the first and second lenses. A focal length of the third lens 130 may be −6.017 mm.

The fourth lens 140 has a positive refractive power. An object-side surface of the fourth lens 140 is concave, and an image-side surface thereof may be convex. For example, a first surface of the fourth lens 140 is concave in the paraxial region, and a second surface of the fourth lens 140 is convex in the paraxial region. The fourth lens 140 has an aspherical shape. As an example, both of the object-side surface and the image-side surface of the fourth lens 140 are aspherical. The fourth lens 140 has a refractive index higher than those of the first and second lenses. As an example, the refractive index of the fourth lens 140 is 1.657, which is higher than those of the first and second lenses. A focal length of the fourth lens 140 may be 347.95 mm.

The fifth lens 150 has a negative refractive power. An object-side surface of the fifth lens 150 is concave, and an image-side surface thereof is concave. For example, a first surface of the fifth lens 150 is concave in the paraxial region, and a second surface of the fifth lens 150 is concave in the paraxial region. The fifth lens 150 has an aspherical shape. As an example, both of the object-side surface and the image-side surface of the fifth lens 150 are aspherical. An inflection point is formed on the fifth lens 150. As an example, one or more inflection points are formed on the image-side surface of the fifth lens 150. The fifth lens 150 has a refractive index higher than those of the first and second lenses. As an example, the refractive index of the fifth lens 150 is 1.657, which is higher than those of the first and second lenses. A focal length of the fifth lens 150 may be −120.555 mm.

The sixth lens 160 has a negative refractive power. An object-side surface of the sixth lens 160 is convex, and an image-side surface thereof is concave. For example, a first surface of the sixth lens 160 is convex in the paraxial region, and a second surface of the sixth lens 160 is concave in the paraxial region. The sixth lens 160 has an aspherical shape.

As an example, both of the object-side surface and the image-side surface of the sixth lens 160 are aspherical. An inflection point is formed on the sixth lens 160. As an example, one or more inflection points is formed on the object-side surface and the image-side surface of the sixth lens 160. The sixth lens 160 has a low refractive power. As an example, the refractive index of the sixth lens 160 is 1.537, which is lower than those of the first and second lenses. A focal length of the sixth lens 160 may be −9.940 mm.

The optical system 100 includes a filter 170 and an image sensor 180.

The filter 170 is adjacently disposed to the image-side surface of the sixth lens 160. The filter 170 has a substantially flat plate. The filter 170 filters infrared rays from light refracted from the sixth lens 160.

The image sensor 180 is disposed behind the filter 170. The image sensor 180 has a predetermined size. As an example, a distance (Img HT) (see FIG. 2) from an intersection point between an imaging plane of the image sensor 180 and an optical axis to a diagonal corner of the image sensor 180 may be 3.26 mm.

The optical system 100 includes a stop ST. The stop ST may be disposed adjacently to the object-side surface of the first lens 110. However, a person skill in the art will appreciate that the stop ST may be positioned in between two of the lenses 110 to 160.

Figure 2:
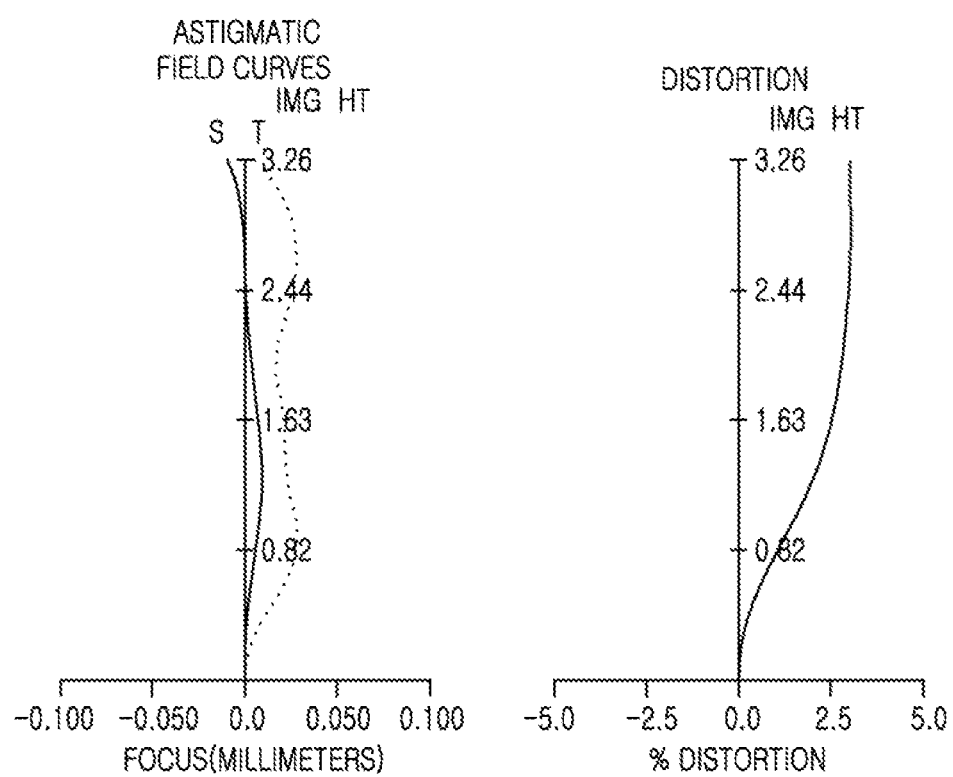
FIG. 2 is graphs having curves representing aberration of the optical system, according to the first embodiment.

The optical system 100 configured as described above represent aberration characteristics and optical characteristics as illustrated in FIGS. 2 and 3. As an example, an F number of the optical system 100 according to an embodiment may be 2.13, an overall length (TTL), which is a distance from the object-side surface of the first lens to the imaging plane of the optical system 100, is 4.632 mm, an overall focal length of the optical system 100 is 4.083 mm, EPD/2 of the optical system 100 is 0.96 mm, and f12 is 2.68082 mm. For reference, FIG. 4 is a table representing aspherical coefficients of the optical system 100.

Figure 5:
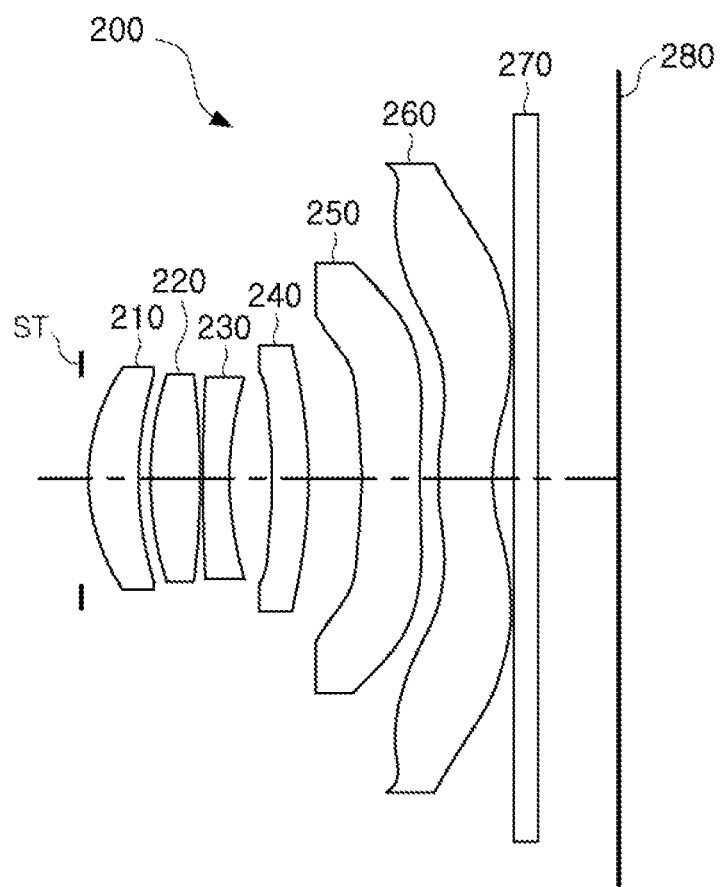
FIG. 5 is a view of an optical system, according to a second embodiment.

An optical system, according to a second embodiment, will be described with reference to FIG. 5.

The optical system 200, according to an embodiment, includes first to sixth lenses 210 to 260. The first to sixth lenses 210 to 260 are sequentially disposed from an object toward an imaging plane.

The first lens 210 has a positive refractive power. An object-side surface of the first lens 210 is convex, and an image-side surface thereof is concave. The first lens 210 has an aspherical shape. As an example, both of the object-side surface and the image-side surface of the first lens 210 are aspherical. The first lens 210 may be formed of a material having a refractive index of 1.547. A focal length of the first lens 210 may be 6.479 mm.

The second lens 220 has a positive refractive power. An object-side surface of the second lens 220 is convex, and an image-side surface thereof is convex. The second lens 220 has an aspherical shape. As an example, both of the object-side surface and the image-side surface of the second lens 220 are aspherical. The second lens 220 is formed of a material that is substantially the same as or similar to that of the first lens. As an example, the second lens 220 has a refractive index of 1.547, which is the same as that of the first lens. A focal length of the second lens 220 may be 4.032 mm.

The third lens 230 has a negative refractive power. An object-side surface of the third lens 230 is convex, and an image-side surface thereof is concave. The third lens 230 has an aspherical shape. As an example, both of the object-side surface and the image-side surface of the third lens 230 are aspherical. The third lens 230 has a refractive index higher than those of the first and second lenses. As an example, the refractive index of the third lens 230 may be 1.657, which is higher than those of the first and second lenses. A focal length of the third lens 230 may be −6.104 mm.

The fourth lens 240 has a negative refractive power. An object-side surface of the fourth lens 240 is concave, and an image-side surface thereof is convex. The fourth lens 240 has an aspherical shape. As an example, both of the object-side surface and the image-side surface of the fourth lens 240 are aspherical. The fourth lens 240 has a refractive index higher than those of the first and second lenses. As an example, the refractive index of the fourth lens 240 is 1.657, which is higher than those of the first and second lenses. A focal length of the fourth lens 240 may be −833.75 mm.

The fifth lens 250 has a negative refractive power. An object-side surface of the fifth lens 250 is concave, and an image-side surface thereof is concave. The fifth lens 250 has an aspherical shape. As an example, both of the object-side surface and the image-side surface of the fifth lens 250 are aspherical. An inflection point is formed on the fifth lens 250. As an example, one or more inflection points is formed on the image-side surface of the fifth lens 250. The fifth lens 250 has a refractive index higher than those of the first and second lenses. As an example, the refractive index of the fifth lens 250 is 1.657, which is higher than those of the first and second lenses. A focal length of the fifth lens 250 may be −279.664 mm.

The sixth lens 260 has a negative refractive power. An object-side surface of the sixth lens 260 is convex, and an image-side surface thereof is concave. The sixth lens 260 has an aspherical shape. As an example, both of the object-side surface and the image-side surface of the sixth lens 260 re aspherical. An inflection point is formed on the sixth lens 260. As an example, one or more inflection points is formed on the object-side surface and the image-side surface of the sixth lens 260. The sixth lens 260 has a low refractive index. As an example, the refractive index of the sixth lens 260 may be 1.537, which is lower than those of the first and second lenses. A focal length of the sixth lens 260 may be −9.708 mm.

The optical system 200 may include a filter 270 and an image sensor 280.

The filter 270 may be disposed adjacently to the image-side surface of the sixth lens 260. The filter 270 may have a substantially flat plate. The filter 270 filters infrared rays from light refracted from the sixth lens 260.

The image sensor 280 may be disposed behind the filter 270. The image sensor 280 has a predetermined size. As an example, a distance (Img HT) (see FIG. 6) from an intersection point between an imaging plane of the image sensor 280 and an optical axis to a diagonal corner of the image sensor 280 is 3.26 mm.

The optical system 200 may include a stop ST. The stop ST may be disposed adjacently to the object-side surface of the first lens 210.

Figure 6:
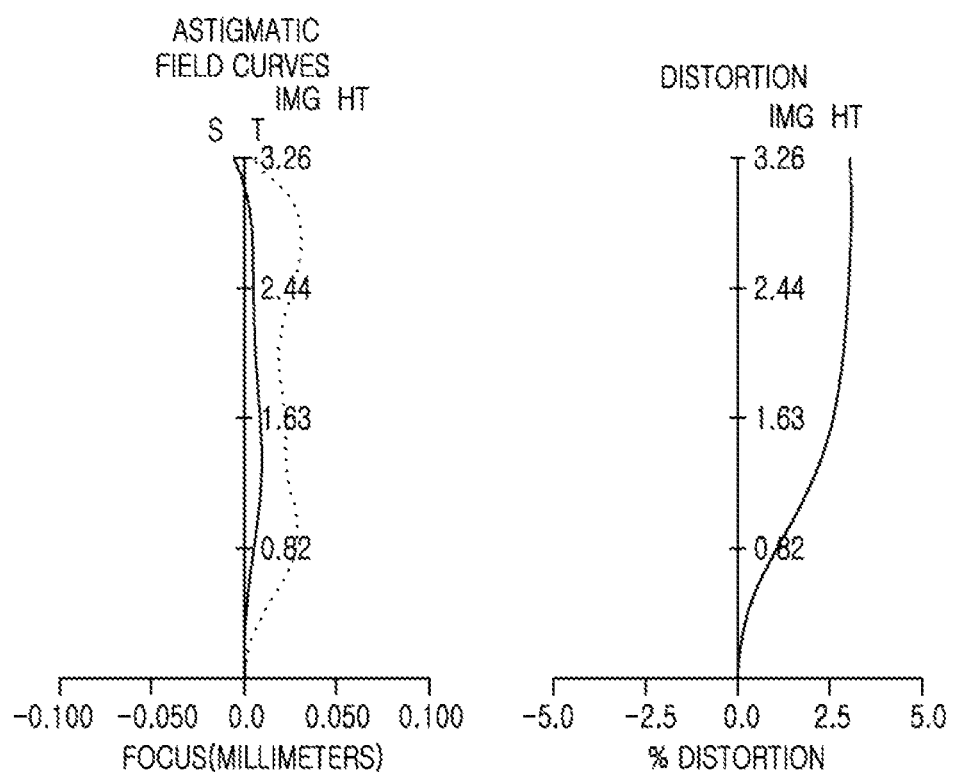
FIG. 6 is graphs having curves representing aberration of the optical system, according to the second embodiment.

The optical system 200 configured as described above, represents aberration characteristics and optical characteristics as illustrated in FIGS. 6 and 7. As an example, an F number of the optical system 200, according to an embodiment, may be 2.13, an overall length (TTL), which is a distance from the object-side surface of the first lens to the imaging plane, of the optical system 200 is 4.632 mm, an overall focal length of the optical system 200 is 4.091 mm, EPD/2 of the optical system 200 is 0.96 mm, and f12 is 2.69113 mm. For reference, FIG. 8 is a table representing aspherical coefficients of the optical system 200.

Figure 9:
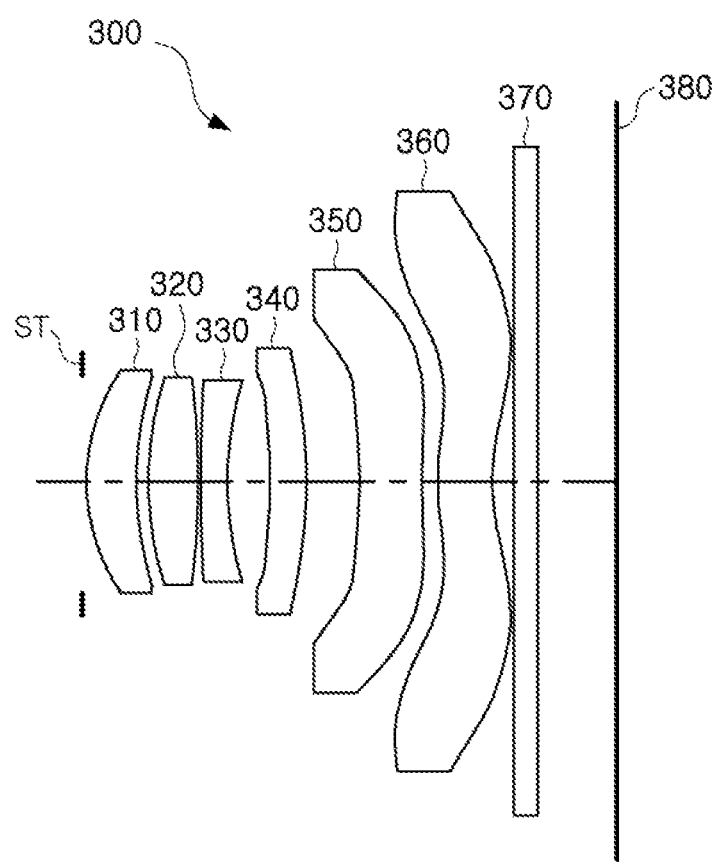
FIG. 9 is a view of an optical system, according to a third embodiment.

An optical system, according to a third embodiment, will be described with reference to FIG. 9.

The optical system 300, according to an embodiment, includes first to sixth lenses 310 to 360. The first to sixth lenses 310 to 360 are sequentially disposed from an object toward an imaging plane.

The first lens 310 has a positive refractive power. An object-side surface of the first lens 310 is convex, and an image-side surface thereof is concave. The first lens 310 has an aspherical shape. As an example, both of the object-side surface and the image-side surface of the first lens 310 are aspherical. The first lens 310 is formed of a material having a refractive index of 1.547. A focal length of the first lens 310 may be 6.362 mm.

The second lens 320 has a positive refractive power. An object-side surface of the second lens 320 is convex, and an image-side surface thereof is convex. The second lens 320 has an aspherical shape. As an example, both of the object-side surface and the image-side surface of the second lens 320 are aspherical. The second lens 320 is formed of a material that is substantially the same as or similar to that of the first lens. As an example, the second lens 320 has a refractive power of 1.547, which is the same as that of the first lens. A focal length of the second lens 320 may be 4.008 mm.

The third lens 330 has a negative refractive power. An object-side surface of the third lens 330 is convex, and an image-side surface thereof is concave. The third lens 330 has an aspherical shape. As an example, both of the object-side surface and the image-side surface of the third lens 330 are aspherical. The third lens 330 has a refractive index higher than those of the first and second lenses. As an example, the refractive index of the third lens 330 is 1.657, which is higher than those of the first and second lenses. A focal length of the third lens 330 may be −6.002 mm.

The fourth lens 340 has a positive refractive power. An object-side surface of the fourth lens 340 is concave, and an image-side surface thereof is convex. The fourth lens 340 has an aspherical shape. As an example, both of the object-side surface and the image-side surface of the fourth lens 340 are aspherical. The fourth lens 340 has a refractive index higher than those of the first and second lenses. As an example, refractive index of the fourth lens 340 is 1.657, which is higher than those of the first and second lenses. A focal length of the fourth lens 340 may be 186.48 mm.

The fifth lens 350 has a negative refractive power. An object-side surface of the fifth lens 350 is concave, and an image-side surface thereof is concave. The fifth lens 350 has an aspherical shape. As an example, both of the object-side surface and the image-side surface of the fifth lens 350 are aspherical. An inflection point is formed on the fifth lens 350. As an example, one or more inflection points is formed on the image-side surface of the fifth lens 350. The fifth lens 350 has a refractive index higher than those of the first and second lenses. As an example, the refractive index of the fifth lens 350 is 1.657, which is higher than those of the first and second lenses. A focal length of the fifth lens 350 may be −63.924 mm.

The sixth lens 360 has a negative refractive power. An object-side surface of the sixth lens 360 is convex, and an image-side surface thereof is concave. The sixth lens 360 has an aspherical shape. As an example, both of the object-side surface and the image-side surface of the sixth lens 360 are aspherical. An inflection point is formed on the sixth lens 360. As an example, one or more inflection points is formed on the object-side surface and the image-side surface of the sixth lens 360. The sixth lens 360 has a low refractive index. As an example, the refractive index of the sixth lens 360 is 1.537, which is lower than those of the first and second lenses. A focal length of the sixth lens 360 may be −9.739 mm.

The optical system 300 may include a filter 370 and an image sensor 380.

The filter 370 may be disposed adjacently to the image-side surface of the sixth lens 360. The filter 370 may have a substantially flat plate. The filter 370 may filter infrared rays from light refracted from the sixth lens 360.

The image sensor 380 may be disposed behind the filter 370. The image sensor 380 has a predetermined size. As an example, a distance (Img HT) (see FIG. 10) from an intersection point between an imaging plane of the image sensor 380 and an optical axis to a diagonal corner of the image sensor 380 may be 3.26 mm.

The optical system 300 may include a stop ST. The stop ST may be disposed adjacently to the object-side surface of the first lens 310.

Figure 10:
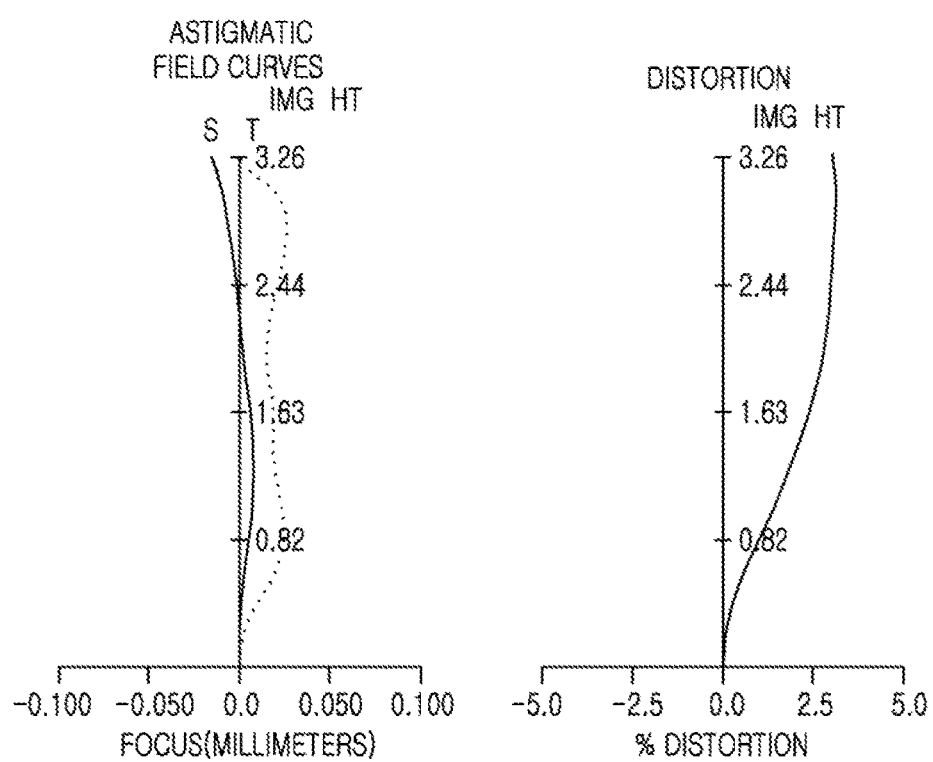
FIG. 10 is graphs having curves representing aberration of the optical system, according to the third embodiment.

The optical system 300 configured as described above represents aberration characteristics and optical characteristics as illustrated in FIGS. 10 and 11. As an example, an F number of the optical system 300, according to an embodiment, is 2.13, an overall length (TTL), which is a distance from the object-side surface of the first lens to the imaging plane, of the optical system 300 is 4.632 mm, an overall focal length of the optical system 300 is 4.096 mm, EPD/2 of the optical system 300 is 0.96 mm, and f12 is 2.66683 mm. For reference, FIG. 12 is a table representing aspherical coefficients of the optical system 300.

Figure 13:
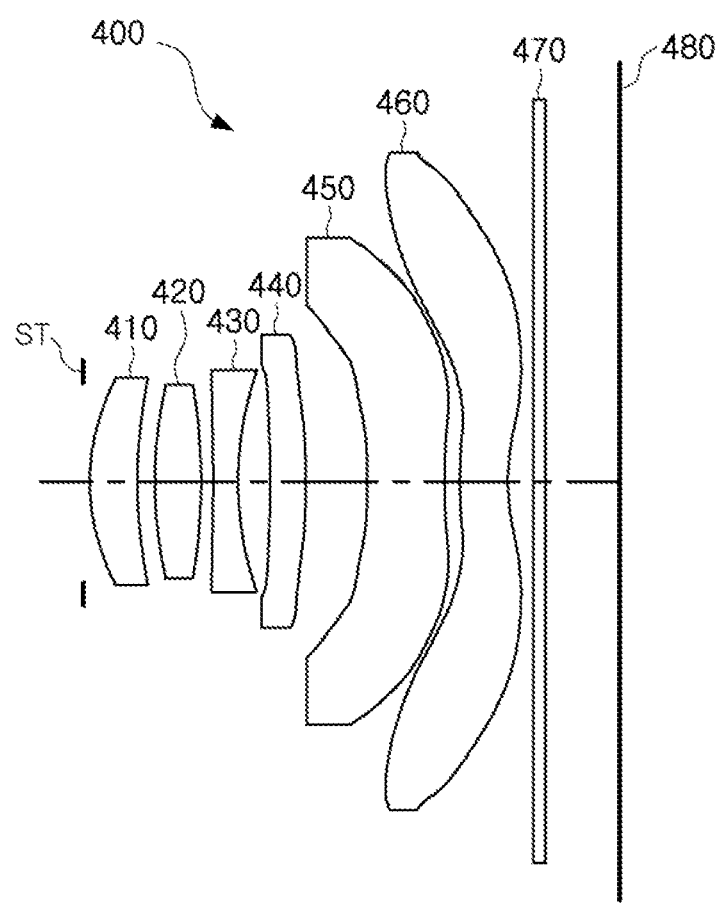
FIG. 13 is a view of an optical system, according to a fourth embodiment.

An optical system, according to a fourth embodiment, will be described with reference to FIG. 13.

The optical system 400, according to an embodiment, includes first to sixth lenses 410 to 460. The first to sixth lenses 410 to 460 are sequentially disposed from an object toward an imaging plane.

The first lens 410 has a positive refractive power. An object-side surface of the first lens 410 is convex, and an image-side surface thereof is concave. The first lens 410 has an aspherical shape. As an example, both of the object-side surface and the image-side surface of the first lens 410 are aspherical. The first lens 410 is formed of a material having a refractive index of 1.547. A focal length of the first lens 410 may be 5.410 mm.

The second lens 420 has a positive refractive power. An object-side surface of the second lens 420 is convex, and an image-side surface thereof is convex. The second lens 420 has an aspherical shape. As an example, both of the object-side surface and the image-side surface of the second lens 420 are aspherical. The second lens 420 is formed of a material that is substantially the same as or similar to that of the first lens. As an example, the second lens 420 has a refractive index of 1.547, which is the same as that of the first lens. A focal length of the second lens 420 may be 5.455 mm.

The third lens 430 has a negative refractive power. An object-side surface of the third lens 430 is convex, and an image-side surface thereof is concave. The third lens 430 has an aspherical shape. As an example, both of the object-side surface and the image-side surface of the third lens 430 are aspherical. The third lens 430 has a refractive index higher than those of the first and second lenses. As an example, the refractive index of the third lens 430 is 1.657, which is higher than those of the first and second lenses. A focal length of the third lens 430 may be −6.393 mm.

The fourth lens 440 has a positive refractive power. An object-side surface of the fourth lens 440 is concave, and an image-side surface thereof is convex. The fourth lens 440 has an aspherical shape. As an example, both of the object-side surface and the image-side surface of the fourth lens 440 are aspherical. The fourth lens 440 has a refractive index higher than those of the first and second lenses. As an example, the refractive index of the fourth lens 440 may be 1.657, which is higher than those of the first and second lenses. A focal length of the fourth lens 440 may be 15.92 mm.

The fifth lens 450 has a negative refractive power. An object-side surface of the fifth lens 450 is concave, and an image-side surface thereof is concave. The fifth lens 450 has an aspherical shape. As an example, both of the object-side surface and the image-side surface of the fifth lens 450 are aspherical. An inflection point is formed on the fifth lens 450. As an example, one or more inflection points is formed on the image-side surface of the fifth lens 450. The fifth lens 450 has a refractive index higher than those of the first and second lenses. As an example, the refractive index of the fifth lens 450 is 1.657, which is higher than those of the first and second lenses. A focal length of the fifth lens 450 may be −762.392 mm.

The sixth lens 460 has a negative refractive power. An object-side surface of the sixth lens 460 is convex, and an image-side surface thereof is concave. The sixth lens 460 has an aspherical shape. As an example, both of the object-side surface and the image-side surface of the sixth lens 460 are aspherical. An inflection point is formed on the sixth lens 460. As an example, one or more inflection points is formed on the object-side surface and the image-side surface of the sixth lens 460. The sixth lens 460 has a low refractive index. As an example, the refractive index of the sixth lens 460 is 1.537, which is lower than those of the first and second lenses. A focal length of the sixth lens 460 may be −5.537 mm.

The optical system 400 may include a filter 470 and an image sensor 480.

The filter 470 may be disposed adjacently to the image-side surface of the sixth lens 460. The filter 470 may have a substantially flat plate. The filter 470 may filter infrared rays from light refracted from the sixth lens 460.

The image sensor 480 may be disposed behind the filter 470. The image sensor 480 has a predetermined size. As an example, a distance (Img HT) (see FIG. 14) from an intersection point between an imaging plane of the image sensor 480 and an optical axis to a diagonal corner of the image sensor 480 is 3.43 mm.

The optical system 400 may include a stop ST. The stop ST may be disposed adjacently to the object-side surface of the first lens 410.

Figure 14:
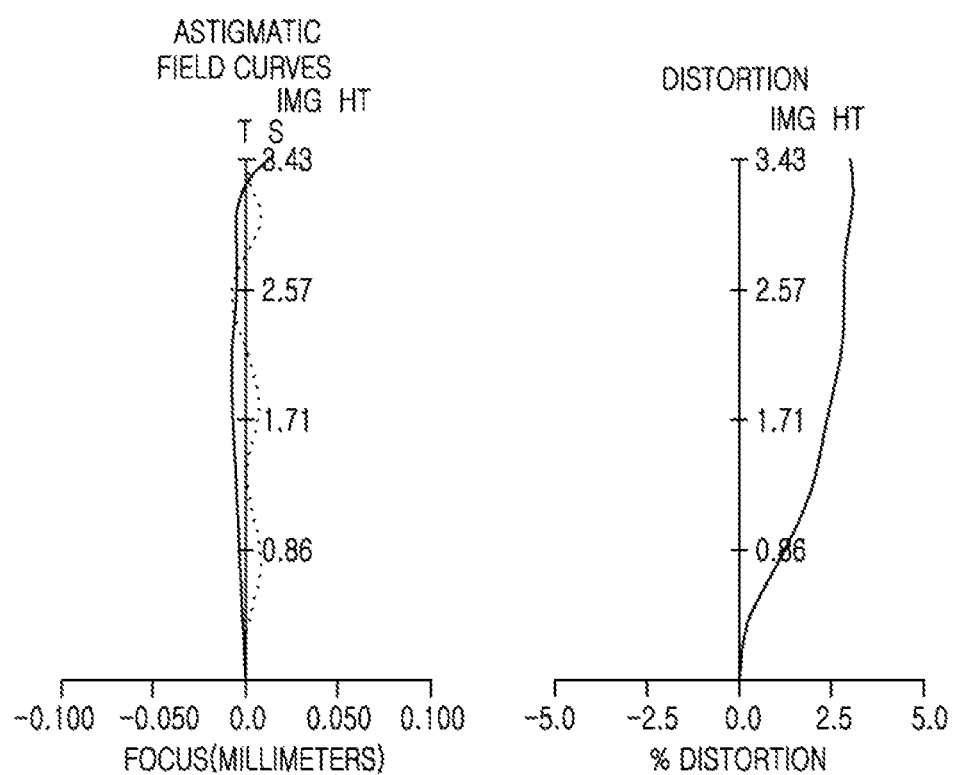
FIG. 14 is graphs having curves representing aberration of the optical system, according to the fourth embodiment.

The optical system 400 configured as described above represents aberration characteristics and optical characteristics as illustrated in FIGS. 14 and 15. As an example, an F number of the optical system 400, according to an embodiment, is 2.31, an overall length (TTL), which is a distance from the object-side surface of the first lens to the imaging plane of the optical system 400 is 4.650 mm, an overall focal length of the optical system 400 is 4.150 mm, EPD/2 of the optical system 400 is 0.90 mm, and f12 is 2.90358 mm. For reference, FIG. 16 is a table representing aspherical coefficients of the optical system 400.

Figure 17:
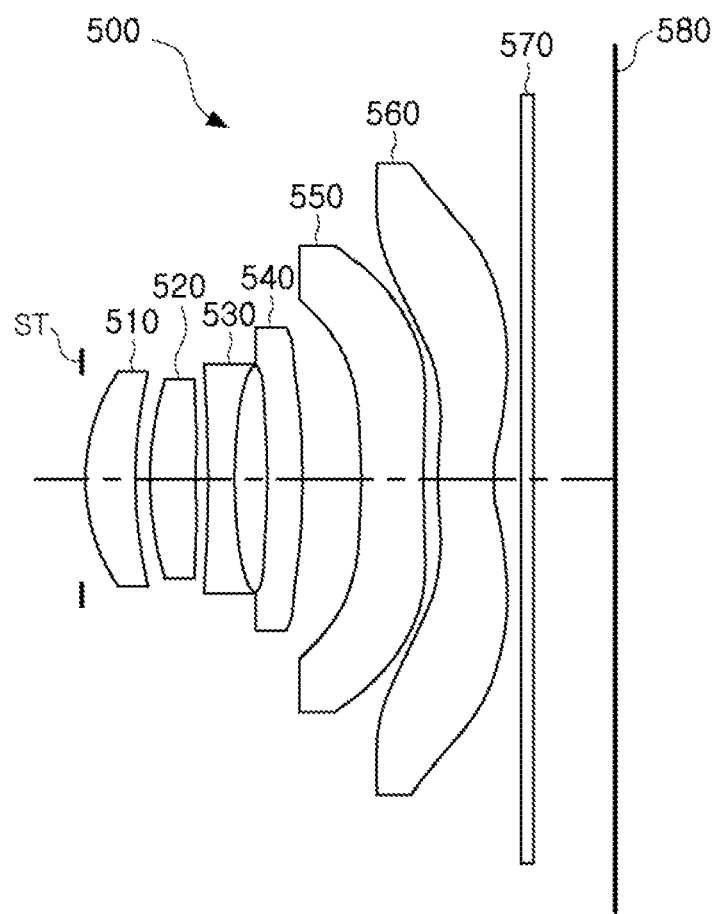
FIG. 17 is a view of an optical system, according to a fifth embodiment.

An optical system, according to a fifth embodiment, will be described with reference to FIG. 17.

The optical system 500, according to an embodiment, includes first to sixth lenses 510 to 560. The first to sixth lenses 510 to 560 are sequentially disposed from an object toward an imaging plane.

The first lens 510 has a positive refractive power. An object-side surface of the first lens 510 is convex, and an image-side surface thereof is concave. The first lens 510 has an aspherical shape. As an example, both of the object-side surface and the image-side surface of the first lens 510 are aspherical. The first lens 510 may be formed of a material having a refractive index of 1.547. A focal length of the first lens 510 may be 5.249 mm.

The second lens 520 has a positive refractive power. An object-side surface of the second lens 520 is convex, and an image-side surface thereof is concave. In an alternative configuration, the second lens 520 includes an object-side surface that is convex, and an image-side surface thereof is flat or substantially flat.

The second lens 520 has an aspherical shape. As an example, both of the object-side surface and the image-side surface of the second lens 520 are aspherical. The second lens 520 is formed of a material that is substantially the same as or similar to that of the first lens. As an example, the second lens 520 has a refractive index of 1.547, which is the same as that of the first lens. A focal length of the second lens 520 may be 6.964 mm.

The third lens 530 has a negative refractive power. An object-side surface of the third lens 530 is convex, and an image-side surface thereof is concave. The third lens 530 has an aspherical shape. As an example, both of the object-side surface and the image-side surface of the third lens 530 are aspherical. The third lens 530 has a refractive index higher than those of the first and second lenses. As an example, the refractive index of the third lens 530 is 1.657, which is higher than those of the first and second lenses. A focal length of the third lens 530 may be −8.818 mm.

The fourth lens 540 has a positive refractive power. An object-side surface of the fourth lens 540 is concave, and an image-side surface thereof is convex. The fourth lens 540 has an aspherical shape. As an example, both of the object-side surface and the image-side surface of the fourth lens 540 are aspherical. The fourth lens 540 has a refractive index higher than those of the first and second lenses. As an example, the refractive index of the fourth lens 540 is 1.657, which is higher than those of the first and second lenses. A focal length of the fourth lens 540 may be 17.91 mm.

The fifth lens 550 has a negative refractive power. An object-side surface of the fifth lens 550 is concave, and an image-side surface thereof is concave. The fifth lens 550 has an aspherical shape. As an example, both of the object-side surface and the image-side surface of the fifth lens 550 are aspherical. An inflection point is formed on the fifth lens 550. As an example, one or more inflection points is formed on the image-side surface of the fifth lens 550. The fifth lens 550 has a refractive index higher than those of the first and second lenses. As an example, the refractive index of the fifth lens 550 is 1.657, which is higher than those of the first and second lenses. A focal length of the fifth lens 550 may be −686.904 mm.

The sixth lens 560 has a negative refractive power. An object-side surface of the sixth lens 560 is convex, and an image-side surface thereof is concave. The sixth lens 560 has an aspherical shape. As an example, both of the object-side surface and the image-side surface of the sixth lens 560 are aspherical. An inflection point is formed on the sixth lens 560. As an example, one or more inflection points is formed on the object-side surface and the image-side surface of the sixth lens 560. The sixth lens 560 has a low refractive index. As an example, the refractive index of the sixth lens 560 is 1.537, which is lower than those of the first and second lenses. A focal length of the sixth lens 560 may be −6.296 mm.

The optical system 500 may include a filter 570 and an image sensor 580.

The filter 570 may be disposed adjacently to the image-side surface of the sixth lens 560. The filter 570 may have a substantially flat plate. The filter 570 may filter infrared rays from light refracted from the sixth lens 560.

The image sensor 580 may be disposed behind the filter 570. The image sensor 580 may have a predetermined size. As an example, a distance (Img HT) (see FIG. 18) from an intersection point between an imaging plane of the image sensor 580 and an optical axis to a diagonal corner of the image sensor 580 is 3.43 mm.

The optical system 500 may include a stop ST. The stop ST may be disposed adjacently to the object-side surface of the first lens 510.

Figure 18:
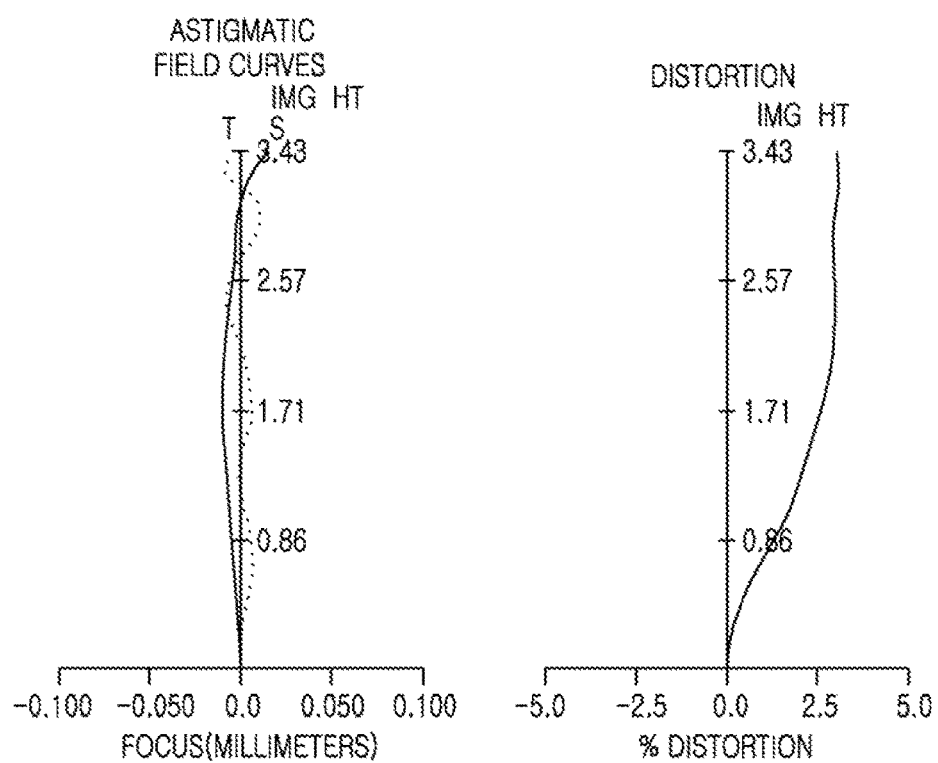
FIG. 18 is graphs having curves representing aberration of the optical system, according to the fifth embodiment.

The optical system 500 configured as described above represents aberration characteristics and optical characteristics as illustrated in FIGS. 18 and 19. As an example, an F number of the optical system 500, according to an embodiment, is 2.25, an overall length (TTL), which is a distance from the object-side surface of the first lens to the imaging plane of the optical system 500, is 4.500 mm, an overall focal length of the optical system 500 is 4.059 mm, EPD/2 of the optical system 500 is 0.90 mm, and f12 is 3.13502 mm. For reference, FIG. 20 is a table representing aspherical coefficients of the optical system 500.

Figure 21:
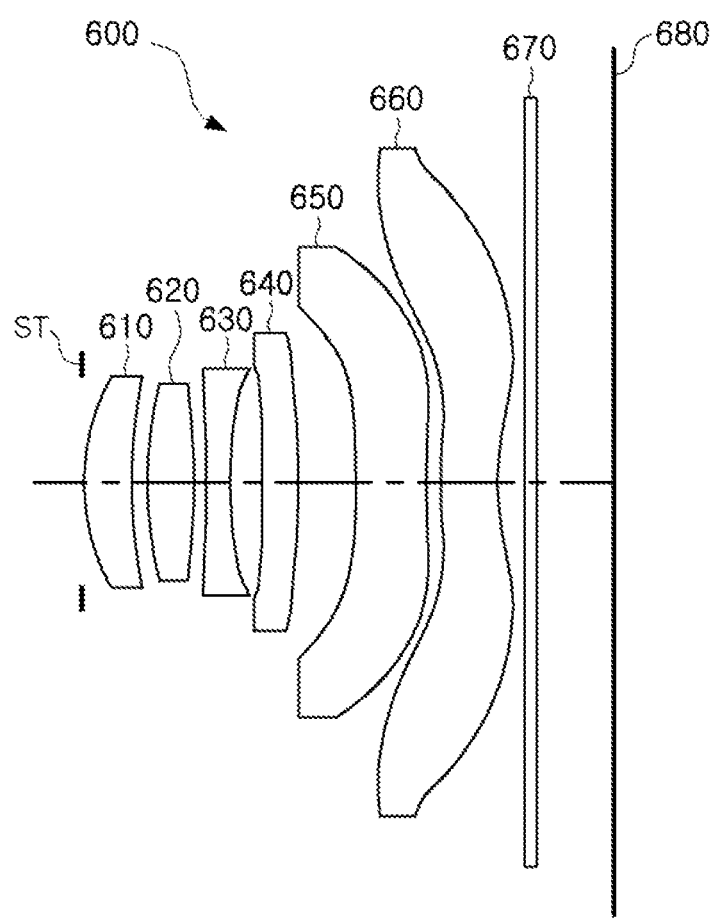
FIG. 21 is a view of an optical system according to a sixth embodiment.

An optical system, according to a sixth embodiment, will be described with reference to FIG. 21.

The optical system 600, according to an embodiment, includes first to sixth lenses 610 to 660. The first to sixth lenses 610 to 660 are sequentially disposed from an object toward an imaging plane.

The first lens 610 has a positive refractive power. An object-side surface of the first lens 610 is convex, and an image-side surface thereof is concave. The first lens 610 has an aspherical shape. As an example, both of the object-side surface and the image-side surface of the first lens 610 are aspherical. The first lens 610 is formed of a material having a refractive index of 1.547. A focal length of the first lens 610 may be 5.236 mm.

The second lens 620 has a positive refractive power. An object-side surface of the second lens 620 is convex, and an image-side surface thereof is convex. The second lens 620 has an aspherical shape. As an example, both of the object-side surface and the image-side surface of the second lens 620 are aspherical. The second lens 620 is formed of a material that is substantially the same as or similar to that of the first lens. As an example, the second lens 620 has a refractive index of 1.547, which is the same as that of the first lens. A focal length of the second lens 620 may be 6.072 mm.

The third lens 630 has a negative refractive power. An object-side surface of the third lens 630 is convex, and an image-side surface thereof is concave. The third lens 630 has an aspherical shape. As an example, both of the object-side surface and the image-side surface of the third lens 630 are aspherical. The third lens 630 has a refractive index higher than those of the first and second lenses. As an example, the refractive index of the third lens 630 is 1.657, which is higher than those of the first and second lenses. A focal length of the third lens 630 may be −7.313 mm.

The fourth lens 640 has a positive refractive power. An object-side surface of the fourth lens 640 is concave, and an image-side surface thereof is convex. The fourth lens 640 has an aspherical shape. As an example, both of the object-side surface and the image-side surface of the fourth lens 640 are aspherical. The fourth lens 640 has a refractive index higher than those of the first and second lenses. As an example, the refractive index of the fourth lens 640 is 1.657, which is higher than those of the first and second lenses. A focal length of the fourth lens 640 may be 20.74 mm.

The fifth lens 650 has a negative refractive power. An object-side surface of the fifth lens 650 is concave, and an image-side surface thereof is concave. The fifth lens 650 has an aspherical shape. As an example, both of the object-side surface and the image-side surface of the fifth lens 650 are aspherical. An inflection point is formed on the fifth lens 650. As an example, one or more inflection points is formed on the image-side surface of the fifth lens 650. The fifth lens 650 has a refractive index higher than those of the first and second lenses. As an example, the refractive index of the fifth lens 650 is 1.657, which is higher than those of the first and second lenses. A focal length of the fifth lens 650 may be −762.404 mm.

The sixth lens 660 has a negative refractive power. An object-side surface of the sixth lens 660 is convex, and an image-side surface thereof is concave. The sixth lens 660 has an aspherical shape. As an example, both of the object-side surface and the image-side surface of the sixth lens 660 are aspherical. An inflection point is formed on the sixth lens 660. As an example, one or more inflection points is formed on the object-side surface and the image-side surface of the sixth lens 660. The sixth lens 660 has a low refractive index. As an example, the refractive index of the sixth lens 660 is 1.537, which is lower than those of the first and second lenses. A focal length of the sixth lens 660 may be −6.090 mm.

The optical system 600 may include a filter 670 and an image sensor 680.

The filter 670 may be disposed adjacently to the image-side surface of the sixth lens 660. The filter 670 may have a substantially flat plate. The filter 670 may filter infrared rays from light refracted from the sixth lens 660.

The image sensor 680 may be disposed behind the filter 670. The image sensor 680 has a predetermined size. As an example, a distance (Img HT) (see FIG. 22) from an intersection point between an imaging plane of the image sensor 680 and an optical axis to a diagonal corner of the image sensor 680 is 3.43 mm.

The optical system 600 may include a stop ST. The stop ST may be disposed adjacently to the object-side surface of the first lens 610.

Figure 22:
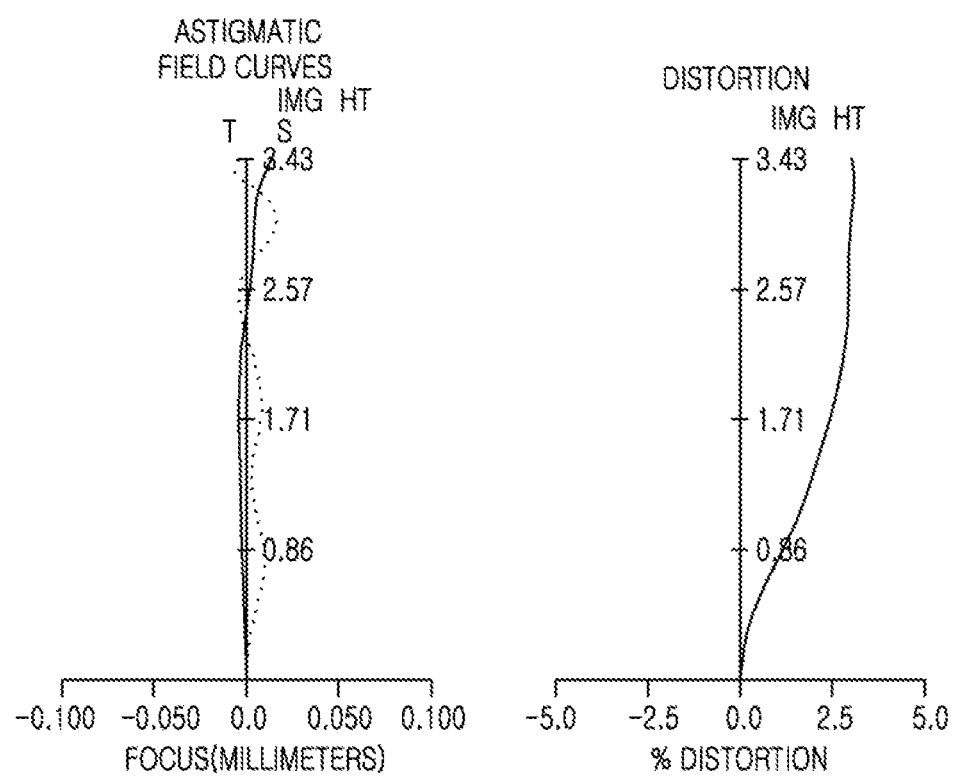
FIG. 22 is graphs having curves representing aberration of the optical system, according to the sixth embodiment.

The optical system 600 configured as described above represents aberration characteristics and optical characteristics as illustrated in FIGS. 22 and 23. As an example, an F number of the optical system 600, according to an embodiment, is 2.29, an overall length (TTL), which is a distance from the object-side surface of the first lens to the imaging plane of the optical system 600, is 4.600 mm, an overall focal length of the optical system 600 is 4.129 mm, EPD/2 of the optical system 600 is 0.90 mm, and f12 is 2.98069 mm. For reference, FIG. 24 is a table representing aspherical coefficients of the optical system 600.

The optical systems, according to the first to sixth embodiments configured as described above, satisfy all of the Conditional Expressions 1 through 18, as represented in Table 1.

TABLE 1

| Remark | Conditional Expression | First Embodiment | Second Embodiment | Third Embodiment | Fourth Embodiment | Fifth Embodiment | Sixth Embodiment |
|---|---|---|---|---|---|---|---|
| 1 | 1 < f1/f < 1.8 | 1.575 | 1.584 | 1.553 | 1.304 | 1.293 | 1.268 |
| 2 | V1-V2 < 25 | 0.0 | 0.0 | 0.0 | 0.0 | 0.0 | 0.0 |
| 3 | 15 < |V1-V3| | 34.60 | 34.60 | 34.60 | 34.60 | 34.60 | 34.60 |
| 4 | 25 < V1-V5 < 45 | 34.60 | 34.60 | 34.60 | 34.60 | 34.60 | 34.60 |
| 5 | 0.5 < f2/f < 2.0 | 0.986 | 0.986 | 0.978 | 1.315 | 1.716 | 1.470 |
| 6 | −3 < f3/f < −1 | −1.474 | −1.492 | −1.465 | −1.541 | −2.172 | −1.771 |
| 7 | 3 < |f4/f| | 85.214 | 203.786 | 45.523 | 3.837 | 4.412 | 5.023 |
| 8 | f5/f < −10 | −29.525 | −68.356 | −15.605 | −183.709 | −169.238 | −184.633 |
| 9 | TTL/f < 1.5 | 1.134 | 1.132 | 1.131 | 1.120 | 1.109 | 1.114 |
| 10 | 0.5 < f1/f2 < 2.0 | 1.598 | 1.607 | 1.588 | 0.992 | 0.754 | 0.862 |
| 11 | −1.2 < f2/f3 < 0 | −0.669 | −0.661 | −0.668 | −0.853 | −0.790 | −0.830 |
| 12 | BFL/f < 0.5 | 0.273 | 0.274 | 0.269 | 0.237 | 0.255 | 0.243 |
| 13 | D2/f < 0.5 | 0.025 | 0.025 | 0.027 | 0.039 | 0.027 | 0.034 |
| 14 | 0.3 < r6/f < 1.4 | 0.839 | 0.837 | 0.845 | 0.725 | 0.927 | 0.797 |
| 15 | 30 < r10/f | 244.906 | 55.073 | 218.873 | 240.964 | 201.976 | 242.172 |
| 16 | 0.18 < (EPD/2)/f12 | 0.358 | 0.357 | 0.360 | 0.310 | 0.287 | 0.302 |
| 17 | 75 < FOV | 75.30 | 75.10 | 75.10 | 77.40 | 78.70 | 77.70 |
| 18 | F number < 2.3 | 2.130 | 2.130 | 2.130 | 2.310 | 2.250 | 2.290 |

As set forth above, the optical system, according to an embodiment, photographs a clear image.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. An optical system, comprising:
a first lens comprising a positive refractive power;
a second lens comprising a positive refractive power and a convex image-side surface in a paraxial region;
a third lens;
a fourth lens;
a fifth lens comprising a concave object-side surface in a paraxial region and a concave image-side surface in the paraxial region; and
a sixth lens comprising an inflection point formed on an image-side surface thereof,
wherein the first to sixth lenses are sequentially disposed from an object toward an imaging plane,
f, an overall focal length of the optical system, and f1, a focal length of the first lens, satisfy 1.0<f1/f<1.8,
f, and f5 a focal length of the fifth lens, satisfy f5/f<−10;
f2, a focal length of the second lens, and, f3, a focal length of the third lens satisfy −1.2<f2/f3<0, and
f, and r10, a radius of curvature of an image-side surface of the fifth lens, satisfy 30<r10/f.

2. The optical system of claim 1, wherein, V1, an Abbe number of the first lens and, V2, an Abbe number of the second lens satisfy V1-V2<25.

3. The optical system of claim 1, wherein, f, an overall focal length of the optical system and, f2, a focal length of the second lens satisfy 0.5<f2/f<2.0.

4. The optical system of claim 1, wherein, f, an overall focal length of the optical system and, f3, a focal length of the third lens satisfy −3<f3/f<−1.

5. The optical system of claim 1, wherein, f, an overall focal length of the optical system and, f4, a focal length of the fourth lens satisfy 3<1f4/f1.

6. The optical system of claim 1, wherein, f1, a focal length of the first lens and, f2, a focal length of the second lens satisfy 0.5<f1/f2<2.0.

7. The optical system of claim 1, wherein, f, an overall focal length of the optical system and, r6, a radius of curvature of an image-side surface of the third lens satisfy 0.3<r6/f<1.4.

8. The optical system of claim 1, wherein, EPD, a diameter of an entrance pupil of the optical system and, f12, a synthetic focal length of the first lens and the second lens satisfy 0.18<(EPD/2)/f12.

9. An optical system, comprising:
a first lens comprising a positive refractive power;
a second lens comprising a convex image-side surface in a paraxial region;
a third lens comprising a convex object-side surface in the paraxial region;
a fourth lens comprising a convex image-side surface in the paraxial region;
a fifth lens comprising a concave object-side surface in the paraxial region and a concave image-side surface in the paraxial region; and
a sixth lens comprising an inflection point formed on an image-side surface thereof,
wherein the first to sixth lenses are sequentially disposed from an object toward an imaging plane,
f, an overall focal length of the optical system, and f1, a focal length of the first lens, satisfy 1.0<f1/f<1.8,
f, and f5 a focal length of the fifth lens, satisfy f5/f<−10;
f2, a focal length of the second lens, and, f3, a focal length of the third lens satisfy −1.2<f2/f3<0,
f, and r10, a radius of curvature of an image-side surface of the fifth lens, satisfy 30<r10/f.

10. The optical system of claim 9, wherein the first lens comprises a convex object-side surface and a concave image-side surface.

11. The optical system of claim 9, wherein the second lens comprises a convex object-side surface.

12. The optical system of claim 9, wherein the third lens comprises a concave image-side surface.

13. The optical system of claim 9, wherein the fourth lens comprises a concave object-side surface.

14. The optical system of claim 9, wherein the sixth lens comprises a convex object-side surface and a concave image-side surface.

15. An optical system, comprising:
a first lens;
a second lens comprising a convex image-side surface in a paraxial region;
a third lens comprising a convex object-side surface in the paraxial region;
a fourth lens comprising a convex image-side surface in the paraxial region;
a fifth lens comprising a concave object-side surface in the paraxial region and a concave image-side surface in the paraxial region; and
a sixth lens comprising an inflection point formed on an image-side surface thereof, wherein
the second lens has a same refractive index as a refractive index of the first lens,
the third lens, the fourth lens, and the fifth lens have a refractive index higher than the refractive indexes of the first and second lenses, and
the sixth lens has a refractive index lower than the refractive indexes of the first and second lenses,
f, an overall focal length of the optical system, and f1, a focal length of the first lens, satisfy $1.0<f1/f<1.8$,
f, and f5 a focal length of the fifth lens, satisfy $f5/f<-10$;
f2, a focal length of the second lens, and, f3, a focal length of the third lens satisfy $-1.2<f2/f3<0$, and
f, and r10, a radius of curvature of an image-side surface of the fifth lens, satisfy $30<r10/f$.

16. The optical system of claim 15, wherein, V1, an Abbe number of the first lens, V2, an Abbe number of the second lens, V3, an Abbe number of the third lens, and, V5, an Abbe number of the fifth lens satisfy $V1-V2<25$, $15<|V1-V3|$, and $25<V1-V5<45$.

17. The optical system of claim 15, wherein, f, an overall focal length of the optical system, and TTL a distance from the object-side surface of the first lens to an imaging plane satisfy $TTL/f<1.5$.

18. The optical system of claim 15, wherein, f, an overall focal length of the optical system, and, BFL, a distance from an object-side surface of the sixth lens to an imaging plane satisfy $BFL/f<0.5$.

19. The optical system of claim 15, wherein, f, an overall focal length of the optical system, and, D2, a distance from the image-side surface of the first lens to an object-side surface of the second lens satisfy $D2/f<0.1$.

20. The optical system of claim 15, wherein, FOV, a field of view of the optical system satisfy $75<FOV$.

* * * * *